(12) United States Patent
Sanchez Moreno et al.

(10) Patent No.: US 12,281,590 B2
(45) Date of Patent: Apr. 22, 2025

(54) SYSTEM AND METHOD FOR INSTALLATION OR REMOVAL OF ONE OR MORE COMBUSTION CANS

(71) Applicant: General Electric Company, Schenectady, NY (US)

(72) Inventors: Humberto Sanchez Moreno, Queretaro (MX); Artemio Josue Aguilar Cuellar, Queretaro (MX); Juan Daniel Mendez Rodriguez, Queretaro (MX); Alston Ilford Scipio, Mableton, GA (US)

(73) Assignee: GE Infrastructure Technology LLC, Greenville, SC (US)

( * ) Notice: Subject to any disclaimer, the term of this patent is extended or adjusted under 35 U.S.C. 154(b) by 227 days.

(21) Appl. No.: 17/852,580

(22) Filed: Jun. 29, 2022

(65) Prior Publication Data
US 2024/0003269 A1    Jan. 4, 2024

(51) Int. Cl.
*F01D 25/28* (2006.01)
*B66F 3/44* (2006.01)
*F02C 7/00* (2006.01)

(52) U.S. Cl.
CPC .............. *F01D 25/285* (2013.01); *B66F 3/44* (2013.01); *F02C 7/00* (2013.01); *F05D 2230/68* (2013.01)

(58) Field of Classification Search
CPC ....... F05D 2260/02; F02C 7/20; F01D 25/285
See application file for complete search history.

(56) References Cited

U.S. PATENT DOCUMENTS

| | | | | |
|---|---|---|---|---|
| 3,432,911 A | * | 3/1969 | Rodgers | B64F 5/50 |
| | | | | 29/469 |
| 5,921,075 A | * | 7/1999 | Shimoyama | F01D 25/285 |
| | | | | 60/722 |
| 6,431,319 B1 | * | 8/2002 | Myers | B62B 3/02 |
| | | | | 187/244 |
| 8,713,776 B2 | | 5/2014 | Herbold | |
| 8,782,865 B2 | | 7/2014 | Gerengi | |
| 9,255,522 B2 | * | 2/2016 | Sancewich | F01D 9/026 |
| 9,322,504 B2 | | 4/2016 | Davi et al. | |
| 9,404,390 B2 | * | 8/2016 | Griese | F01D 25/285 |

(Continued)

FOREIGN PATENT DOCUMENTS

| | | |
|---|---|---|
| EP | 3051077 A1 | 8/2016 |
| EP | 3178771 A1 | 6/2017 |

(Continued)

OTHER PUBLICATIONS

European Search Report Corresponding to Application No. 23178299 on Nov. 3, 2023.

*Primary Examiner* — Craig Kim
(74) *Attorney, Agent, or Firm* — Dority & Manning, P.A.

(57) ABSTRACT

A lift system and method for installation and removal of a combustion can from a turbomachine are provided. The lift system includes a rail, a portable cart assembly, and a slide assembly. The portable cart assembly includes a combustion can cradle assembly coupled to a telescopic member. The combustion can cradle assembly is configured to removably couple to a combustion can of the turbomachine. The slide assembly is removably couplable to the portable cart assembly and the rail. The slide assembly is movable with the portable cart assembly along the rail to adjust a position of the combustion can cradle assembly.

19 Claims, 15 Drawing Sheets

(56) References Cited

U.S. PATENT DOCUMENTS

| | | | |
|---|---|---|---|
| 9,486,899 B2 | 11/2016 | Mogle, II et al. | |
| 9,885,255 B2 | 2/2018 | Mogle, II et al. | |
| 10,071,450 B2 | 9/2018 | Gerber et al. | |
| 10,174,637 B2 * | 1/2019 | Imfeld | F01D 25/285 |
| 10,208,627 B2 | 2/2019 | Heard et al. | |
| 10,934,893 B2 | 3/2021 | Kolvick et al. | |
| 11,773,772 B2 * | 10/2023 | Aguilar | F01D 25/285 |
| | | | 29/889.2 |
| 12,044,139 B1 * | 7/2024 | Jepson | F01D 25/285 |
| 2014/0123656 A1 * | 5/2014 | Sancewich | F01D 25/285 |
| | | | 60/752 |
| 2015/0136935 A1 * | 5/2015 | Hallam | B64F 5/50 |
| | | | 248/554 |
| 2015/0144761 A1 * | 5/2015 | Davi | F16M 11/2021 |
| | | | 248/657 |
| 2015/0336222 A1 * | 11/2015 | Aratori | F01D 25/285 |
| | | | 29/889.1 |
| 2016/0076773 A1 | 3/2016 | Imfeld et al. | |
| 2016/0363323 A1 | 12/2016 | Mogle et al. | |
| 2017/0167298 A1 | 6/2017 | Kolvick et al. | |
| 2017/0167299 A1 | 6/2017 | Heard et al. | |
| 2017/0268382 A1 * | 9/2017 | Müller | F01D 25/24 |
| 2021/0388737 A1 * | 12/2021 | Foxall | B23P 6/002 |
| 2023/0018703 A1 * | 1/2023 | Aguilar Cuéllar | F01D 25/285 |

FOREIGN PATENT DOCUMENTS

| | | |
|---|---|---|
| EP | 3179168 A1 | 6/2017 |
| KR | 20160029695 A | 3/2016 |
| WO | WO2017/116242 A1 | 7/2017 |
| WO | WO2017/116243 A1 | 7/2017 |
| WO | WO2017/116244 A1 | 7/2017 |

\* cited by examiner

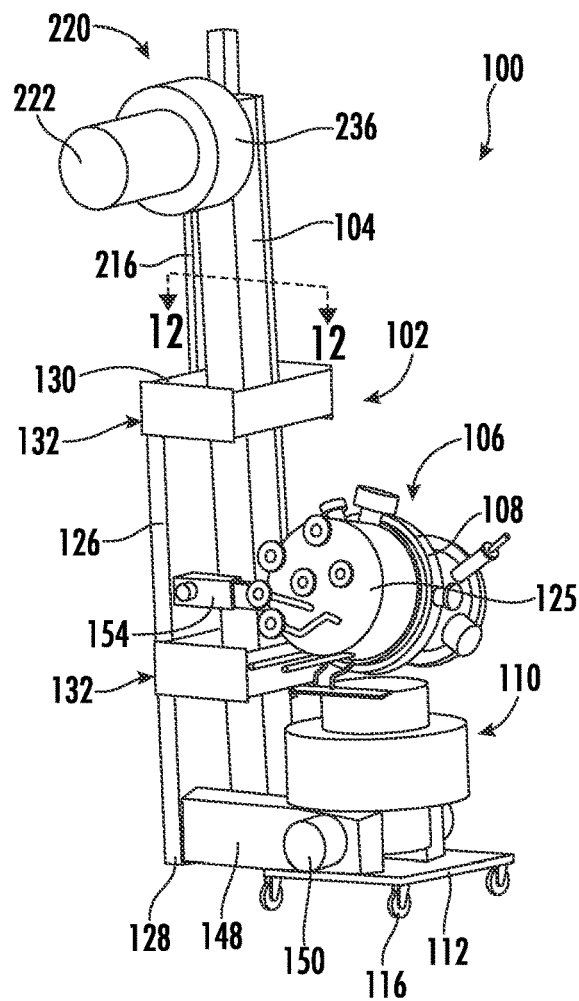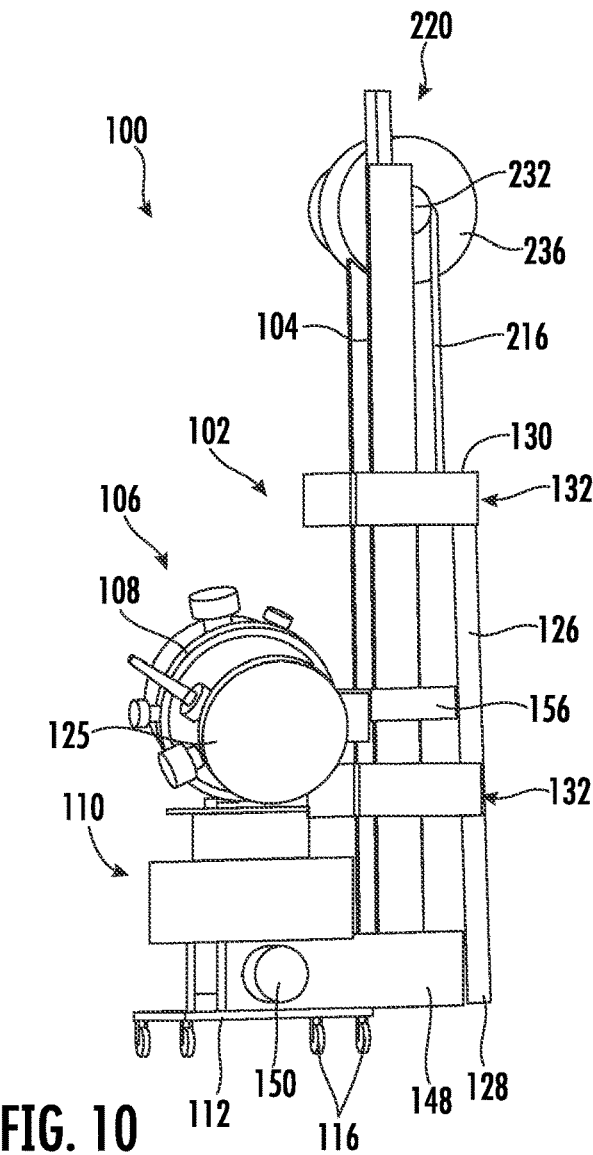
FIG. 9
FIG. 10

SYSTEM AND METHOD FOR INSTALLATION OR REMOVAL OF ONE OR MORE COMBUSTION CANS

FIELD

The present disclosure relates generally to assemblies and methods for installing and/or removing combustion cans from a turbomachine. In particular, the present disclosure relates to systems and methods for installing and/or removing combustion cans from the entirety of a turbomachine combustion section.

BACKGROUND

Turbomachines are utilized in a variety of industries and applications for energy transfer purposes. For example, A gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

More specifically, the combustion section mixes large quantities of fuel and compressed air and burns the resulting mixture. The combustion section of a gas turbines can include an annular array of cylindrical combustion "cans" in which air and fuel are mixed and combustion occurs. Compressed air from an axial compressor flows into the combustor. Fuel is injected through fuel nozzle assemblies, which may extend into each can. The mixture of fuel and air burns in a combustion chamber of each can. The combustion gases discharge from each can into a duct that leads to the turbine.

Combustion cans need to be installed during the initial build of the gas turbine and may subsequently be removed during subsequent maintenance activities. However, to install, remove or re-install one or more combustion cans, a significant amount of force may be required to properly lift, position and/or align each combustion can with respect to the gas turbine. Accordingly, alternative systems and methods for installing and removing combustion cans would be welcome in the art.

BRIEF DESCRIPTION

Aspects and advantages of the lift systems and methods in accordance with the present disclosure will be set forth in part in the following description, or may be obvious from the description, or may be learned through practice of the technology.

In accordance with one embodiment, a lift system for installation and removal of a combustion can from a turbomachine is provided. The lift system includes a rail, a portable cart assembly, and a slide assembly. The portable cart assembly includes a combustion can cradle assembly coupled to a telescopic member. The combustion can cradle assembly is configured to removably couple to a combustion can of the turbomachine. The slide assembly is removably couplable to the portable cart assembly and the rail. The slide assembly is movable with the portable cart assembly along the rail to adjust a position of the combustion can cradle assembly.

In accordance with another embodiment, a method for installation of a combustion can into a combustion section of a turbomachine. The method includes securing the combustion can into a combustion can cradle assembly. The combustion can cradle assembly forms part of a portable cart assembly that includes a telescopic member coupled to the combustion can cradle assembly. The method further includes coupling the portable cart assembly to a slide assembly. The slide assembly is movably coupled to the rail and connected to a drive assembly. The method further includes operating a drive assembly to move the slide assembly and the portable cart assembly along the rail. The method further includes extending the telescopic member to align the combustion can cradle assembly and the combustion can with a respective opening in the combustion section of the turbomachine.

These and other features, aspects and advantages of the present lift systems and methods will become better understood with reference to the following description and appended claims. The accompanying drawings, which are incorporated in and constitute a part of this specification, illustrate embodiments of the technology and, together with the description, explain the principles of the technology.

BRIEF DESCRIPTION OF THE DRAWINGS

A full and enabling disclosure of the present lift systems and methods, including the best mode of making and using the present systems and methods, directed to one of ordinary skill in the art, is set forth in the specification, which refers to the appended figures, in which:

FIG. 9 illustrates perspective view of the lift system in accordance with embodiments of the present disclosure;

FIG. 10 illustrates perspective view of the lift system in accordance with embodiments of the present disclosure;

DETAILED DESCRIPTION

Figure 1:
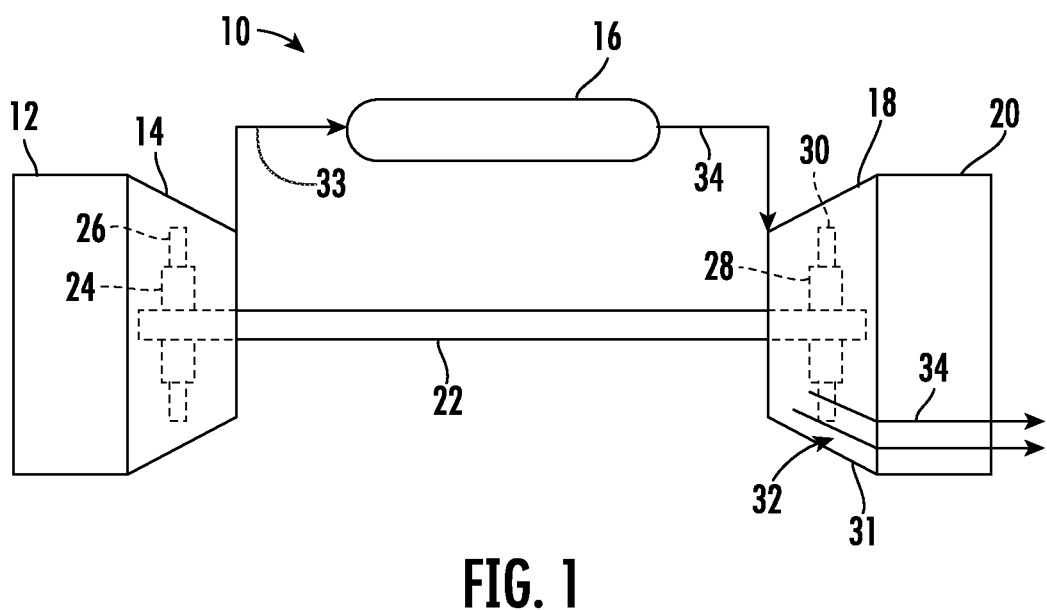
FIG. 1 is a schematic illustration of a turbomachine in accordance with embodiments of the present disclosure.

Reference now will be made in detail to embodiments of the present lift systems and methods, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The term "fluid" may be a gas or a liquid. The term "fluid communication" means that a fluid can make the connection between the areas specified.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. However, the terms "upstream" and "downstream" as used herein may also refer to a flow of electricity. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component.

Terms of approximation, such as "about," "approximately," "generally," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. When used in the context of an angle or direction, such terms include within ten degrees greater or less than the stated angle or direction. For example, "generally vertical" includes directions within ten degrees of vertical in any direction, e.g., clockwise or counterclockwise.

The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive- or and not to an exclusive- or. For example, a condition A or B is satisfied by any one of the following: A is true (or present), and B is false (or not present), A is false (or not present) and B is true (or present), and both A and B are true (or present).

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, FIG. 1 illustrates a schematic diagram of one embodiment of a turbomachine, which in the illustrated embodiment is a gas turbine 10. Although an industrial or land-based gas turbine is shown and described herein, the present disclosure is not limited to a land-based and/or industrial gas turbine unless otherwise specified in the claims. For example, the invention as described herein may be used in any type of turbomachine including but not limited to a steam turbine, an aircraft gas turbine, or a marine gas turbine.

As shown, gas turbine 10 generally includes an inlet section 12, a compressor section 14 disposed downstream of the inlet section 12, a plurality of combustors (not shown) within a combustor (or combustion) section 16 disposed downstream of the compressor section 14, a turbine section 18 disposed downstream of the combustion section 16, and an exhaust section 20 disposed downstream of the turbine section 18. Additionally, the gas turbine 10 may include one or more shafts 22 coupled between the compressor section 14 and the turbine section 18.

The compressor section 14 may generally include a plurality of rotor disks 24 (one of which is shown) and a plurality of rotor blades 26 extending radially outwardly from and connected to each rotor disk 24. Each rotor disk 24 in turn may be coupled to or form a portion of the shaft 22 that extends through the compressor section 14.

The turbine section 18 may generally include a plurality of rotor disks 28 (one of which is shown) and a plurality of rotor blades 30 extending radially outwardly from and being interconnected to each rotor disk 28. Each rotor disk 28 in turn may be coupled to or form a portion of the shaft 22 that extends through the turbine section 18. The turbine section 18 further includes an outer casing 31 that circumferentially surrounds the portion of the shaft 22 and the rotor blades 30, thereby at least partially defining a hot gas path 32 through the turbine section 18.

During operation, a working fluid such as air flows through the inlet section 12 and into the compressor section 14 where the air is progressively compressed, thus providing pressurized air to the combustors of the combustion section 16. The pressurized air is mixed with fuel and burned within each combustor to produce combustion gases 34. The combustion gases 34 flow through the hot gas path 32 from the combustion section 16 into the turbine section 18, wherein energy (kinetic and/or thermal) is transferred from the combustion gases 34 to the rotor blades 30, causing the shaft 22 to rotate. The mechanical rotational energy may then be used to power the compressor section 14 and/or to generate electricity. The combustion gases 34 exiting the turbine section 18 may then be exhausted from the gas turbine 10 via the exhaust section 20.

Figure 2:
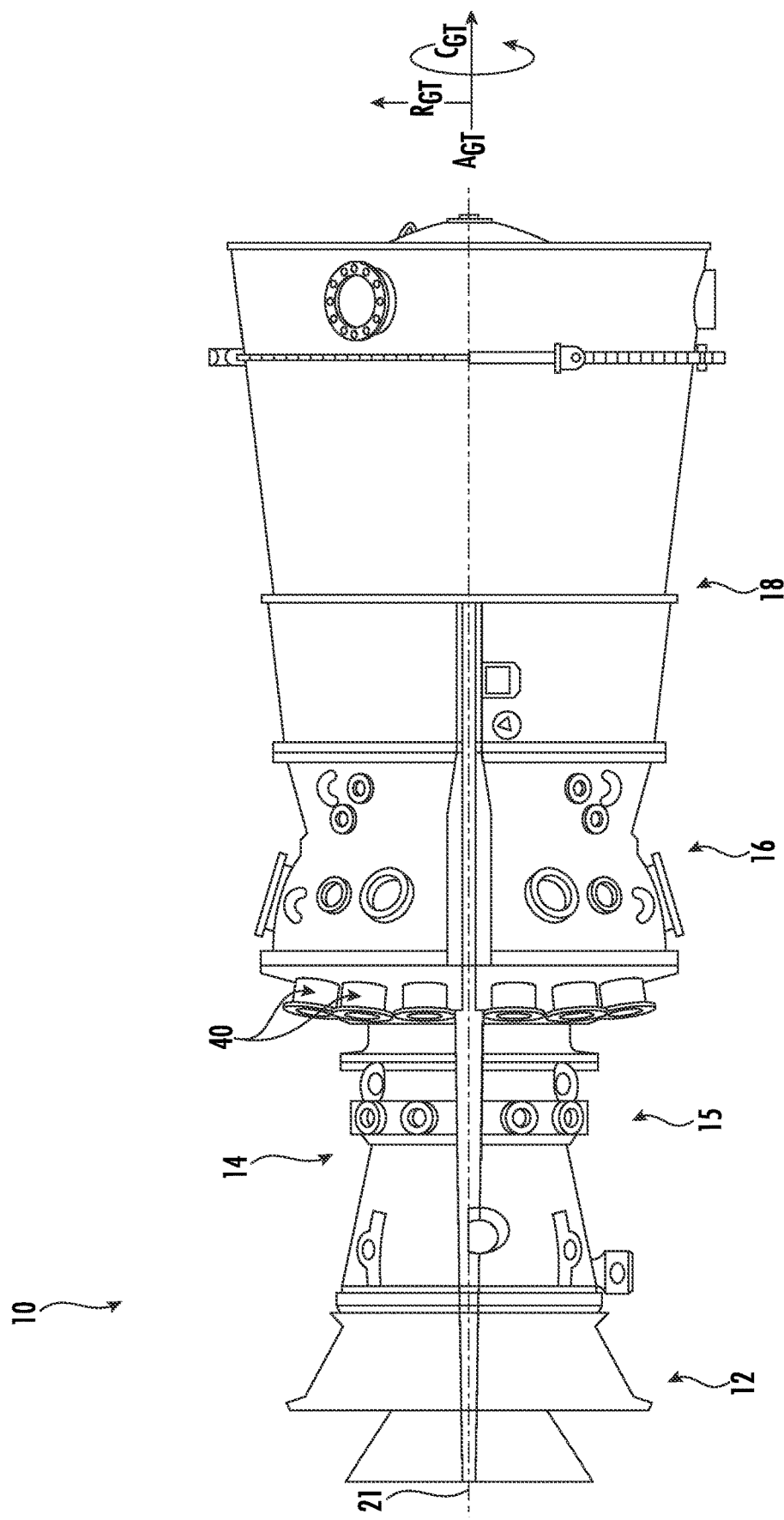
FIG. 2 illustrates a side view of a gas turbine in accordance with embodiments of the present disclosure.

Referring now to FIG. 2, some turbomachines, such as gas turbines, aero-derivatives, burn a fuel and an air mixture during a combustion process to generate energy. FIG. 2 illustrates an example of a gas turbine 10. As shown, the gas turbine 10 may define a cylindrical coordinate system having an axial direction $A_{gt}$ extending along an axial centerline 21, a radial direction $R_{gt}$ perpendicular to the axial centerline 21, and a circumferential direction $C_{gt}$ extending around the axial centerline 21.

Generally, the gas turbine 10 comprises an inlet section 12 that directs an airstream towards a compressor section 14 housed in a compressor casing 15. The airstream is compressed and then discharged to a combustion section 16, where a fuel, such as natural gas, is burned to provide high-energy combustion gases, which drives the turbine section 18. In the turbine section 18, the energy of the hot gases is converted into work, some of which is used to drive the compressor, with the remainder available for useful work to drive a load such as the generator, mechanical drive, or the like (none of which are illustrated).

Figure 3:
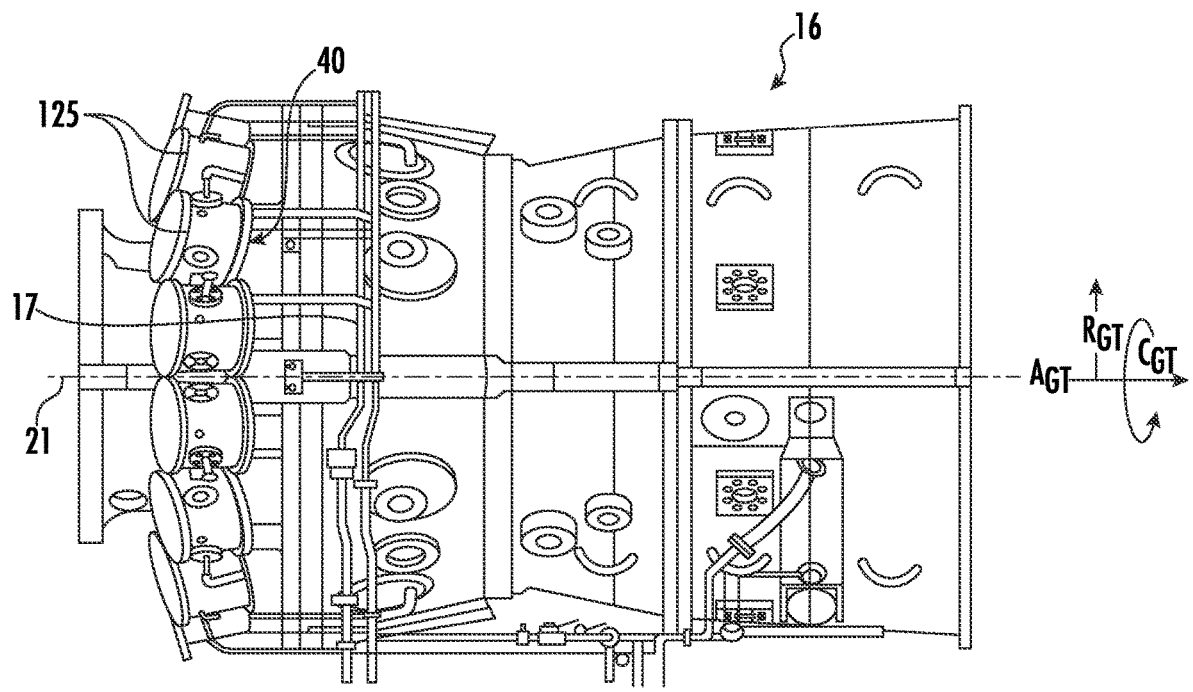
FIG. 3 illustrates a side view of a combustion section of a gas turbine in accordance with embodiments of the present disclosure.

Referring now additionally to FIG. 3, an embodiment of the combustion section 16 may comprise at least one combustor assembly 40. Some gas turbines 10, such as that illustrated in FIG. 3, may comprise a plurality of combustor assemblies disposed in an annular array around the axial centerline 21. Generally, within each combustor assembly 40 (and more specifically, the combustion can 125 of the combustor assembly 40) the combustion process occurs. In some embodiments, combustor assemblies 40 can comprise one or more auxiliary systems such as flame detection systems to monitor the flame burning in some of the combustor assemblies Such flame detection systems may be in the form of a flame scanner, a portion of which may be inserted within the combustor assembly 40. Additional or alternative auxiliary systems 17 may similarly be incorporated into combustor assemblies 40 to monitor, control and/or impact one or more of the combustor assembly processes.

Figure 4:
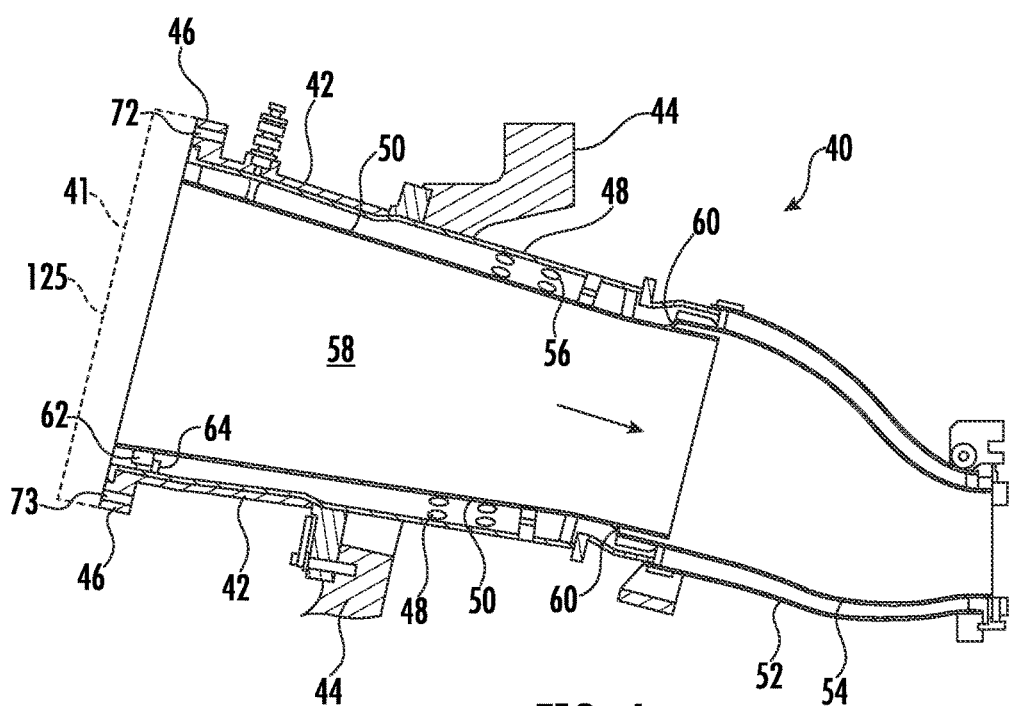
FIG. 4 illustrates a cross-sectional side view of a combustor assembly in accordance with embodiments of the present disclosure.

Referring additionally to FIG. 4, a cross-sectional side view of an embodiment of a combustor assembly 40 of a gas turbine 10 is illustrated. The combustor assembly 40 may generally include at least a combustion can 125 and potentially a substantially cylindrical combustion casing 42 secured to a portion of a gas turbine casing 44, such as a compressor discharge casing or a combustion wrapper casing. As shown, a flange 46 may extend outwardly from an upstream end of the combustion casing 42. The flange 46 may generally be configured such that an end cover assembly 41 of a combustor assembly 40 may be secured to the combustion casing 42. For example, the flange 46 may define a plurality of flange holes 73 for attaching the end cover assembly 41 to the combustion casing 42.

In some embodiments, the combustor assembly 40 may also include an internal flow sleeve 48 and/or a combustion liner 50 substantially concentrically arranged within the flow sleeve 48. The combustor assembly 40 may comprise a unibody combustor assembly 40 comprising the combustion can 125 and at least one of the flow sleeve 48 or combustion liner 50 connected to the combustion can 125 as a single pre-assembled structure, or the combustor assembly 40 may comprise an assembly where the combustion can 125, flow sleeve 48 and combustion liner 50 all connect directly to the gas turbine 10 such as to the gas turbine casing 44 (sometimes referred to as a combustion discharge casing or "CDC"). For example, the flow sleeve 48 and the combustion liner 50 may extend, at their downstream ends, to a double walled transition duct, including an impingement sleeve 52 and a transition piece 54 disposed within the impingement sleeve 52. It should be appreciated that in some embodiments the impingement sleeve 52 and the flow sleeve 48 may be provided with a plurality of air supply holes 56 over a portion of their surfaces, thereby permitting pressurized air from the compressor section 14 to enter the radial space between the combustion liner 50 and the flow sleeve 48.

The combustion liner 50 of the combustor assembly 40 may generally define a substantially cylindrical combustion chamber 58, wherein fuel and air are injected and combusted to produce hot gases of combustion. Additionally, the combustion liner 50 may be coupled at its downstream end to the transition piece 54 such that the combustion liner 50 and the transition piece 54 generally define a flow path for the hot gases of combustion flowing from each combustor assembly 40 to the turbine section 18 of the gas turbine 10.

In some embodiments, such as that illustrated in FIG. 4, the transition piece 54 may be coupled to the downstream end of the combustion liner 50 with a seal 60 (e.g., a compression seal). For example, the seal 60 may be disposed at the overlapping ends of the transition piece 54 and combustion liner 50 to seal the interface between the two components. For example, a seal 60 may comprise a circumferential metal seal configured to be spring/compression loaded between inner and outer diameters of mating parts. It should be appreciated, however, that the interface between the combustion liner 50 and the transition piece 54 need not be sealed with a compression seal 60, but may generally be sealed by any suitable seal known in the art.

In some embodiments, the combustion liner 50 may also include one or more male liner stops 62 that engage one or more female liner stops 64 secured to the flow sleeve 48 or, in combustor assemblies 40 without a flow sleeve 48, the combustion casing 42. In particular, the male liner stops 62 may be adapted to slide into the female liner stops 64 as the combustion liner 50 is installed within the combustor assembly 40 to indicate the proper installation depth of the combustion liner 50 as well as to prevent rotation of the combustion liner 50 during operation of the gas turbine 10. Moreover, it should be appreciated that, in some embodiments, male liner stops 62 may be additionally or alternatively disposed on the flow sleeve 48 or combustion casing while the female liner stops 64 are disposed on the combustion liner 50.

In some embodiments, the combustion liner 50 may first be installed within a combustor assembly 40, by being pushed into the combustor assembly 40. For example, the combustion liner 50 can be pushed into the combustor assembly 40 until a force limits further installation depth into the transition piece 54. With continued reference to FIG. 3, a combustion can 125 can then be installed into each respective combustor assembly 40. Specifically, the combustion can 125 can be positioned, aligned, and inserted such that its end cover assembly 41 can then abut against the flange 46 of the combustor assembly 40.

While specific embodiments have been presented herein, it should be appreciated that the combustor assembly 40 may comprise a variety of different components that are assembled in a variety of different orders with respect to the individual connections made with the gas turbine 10. For example, the combustor assembly 40 may be completely assembled prior to installation onto the gas turbine 10 (e.g., a unibody combustor assembly 40), may be partly assembled prior to installation on the gas turbine 10, may be completely assembled while connected to the gas turbine 10, or combinations thereof.

Figure 5:
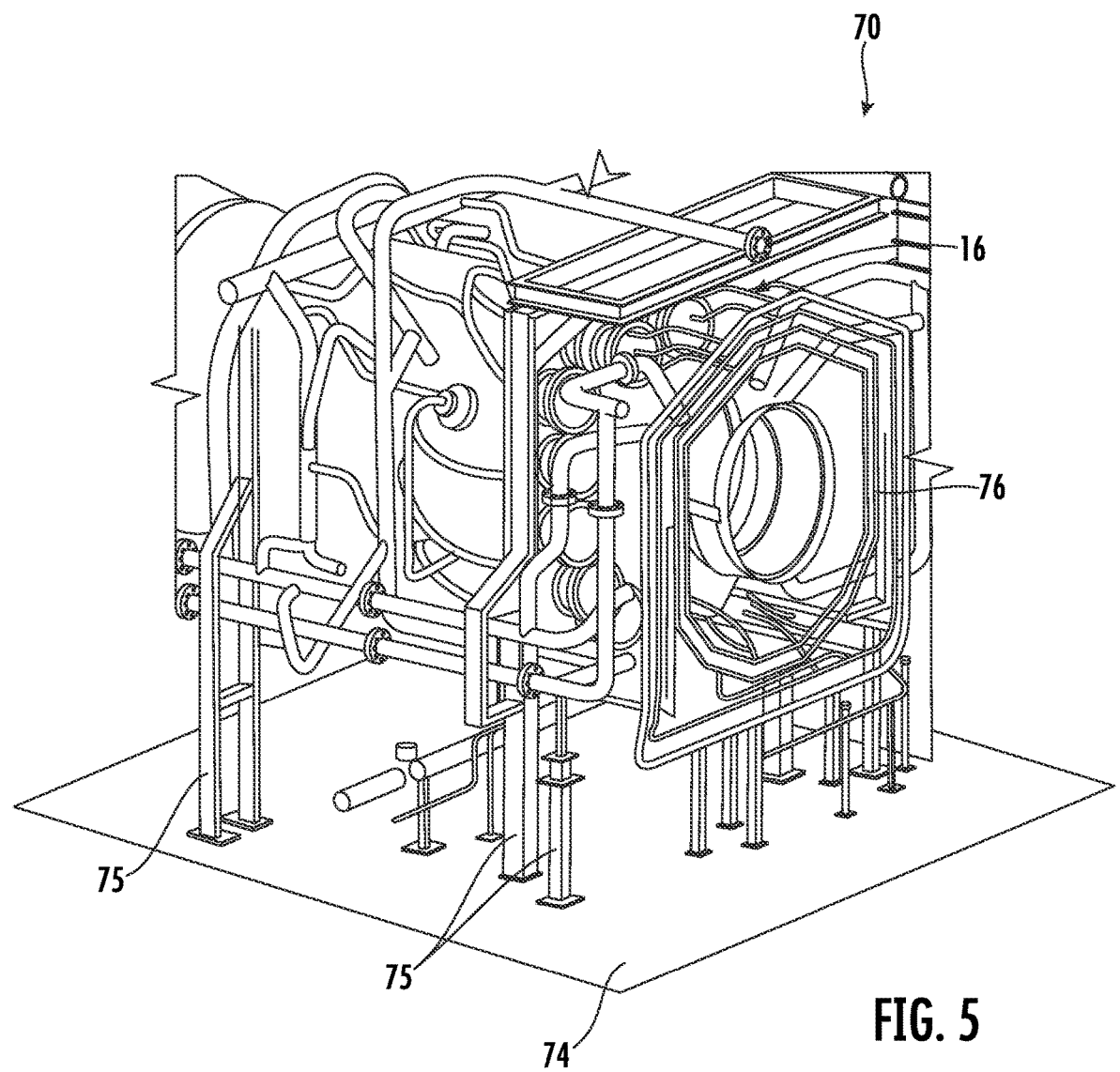
FIG. 5 illustrates an installed gas turbine in accordance with aspects of the present disclosure.

FIG. 5 illustrates an installed gas turbine 70, e.g., installed in a power plant, test stand, or otherwise fully equipped in an operational environment. As shown, the installed gas turbine 70 may include one or more rail supports 75 coupled to the floor 74 (e.g., the ground or a foundation upon which the installed gas turbine 70 is supported) and the installed gas turbine 70 to keep the installed gas turbine 70 lifted (or supported) off the floor 74. The one or more rail supports 75 may extend around the gas turbine, e.g., from a first end coupled to the floor 74 on a first side of the gas turbine, over the top of the gas turbine, to a second end coupled to the floor 74 on a second side of the gas turbine. Additionally, the installed gas turbine 70 may include a plurality of conduits 76 (such as fluid supply conduits or other piping's that supply the installed gas turbine 70 with the necessary fluids for operation). The plurality of conduits 76 may also be coupled to the one or more rail supports 75. As shown in FIG. 5, the plurality of conduits 76 and rail supports 75, as well as any other equipment that may surround the installed gas turbine 70 (including the combustion section 16), can make exchanging, installing, and/or removing the combustion cans 125 from the combustion section 16 difficult due to the lack of physical space in the crowded environment. As will be discussed, the lift system described hereinbelow advantageously allow for installation and/or removal of one or more combustion cans 125 from an installed environment despite the crowded environment.

Figure 6:
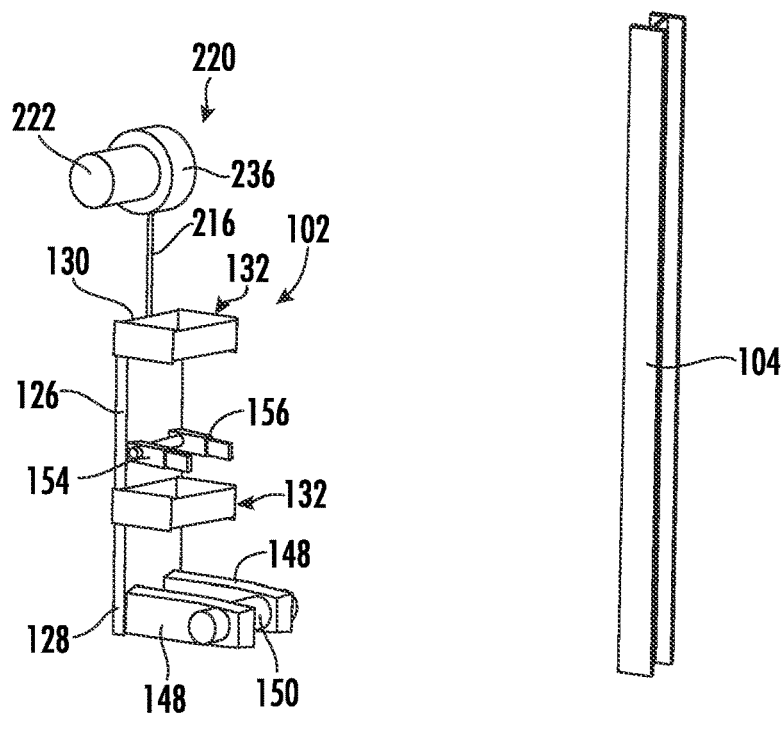
FIG. 6 illustrates a slide assembly and a rail of a lift system in accordance with embodiments of the present disclosure.
Figure 7:
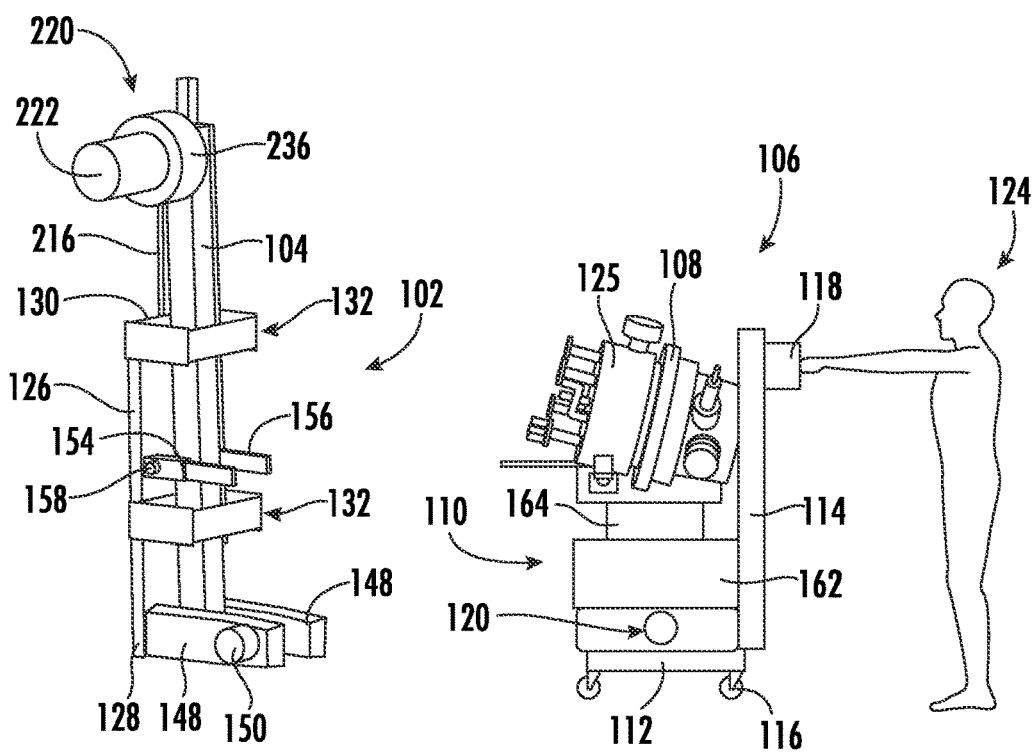
FIG. 7 illustrates a slide assembly coupled to a rail and a portable cart assembly of a lift system in accordance with embodiments of the present disclosure.
Figure 8:
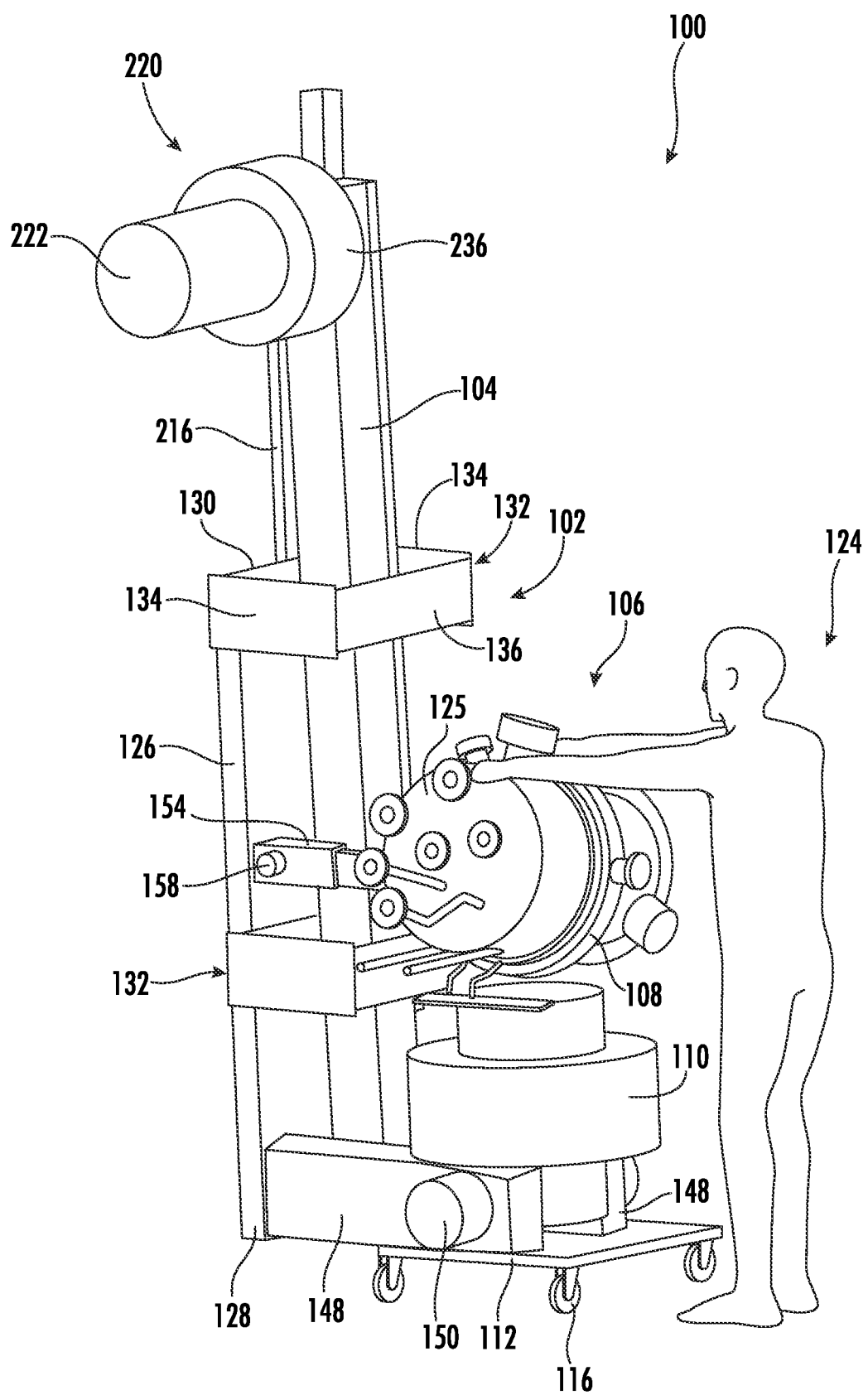
FIG. 8 illustrates a fully assembled lift system in accordance with embodiments of the present disclosure.
Figure 11:
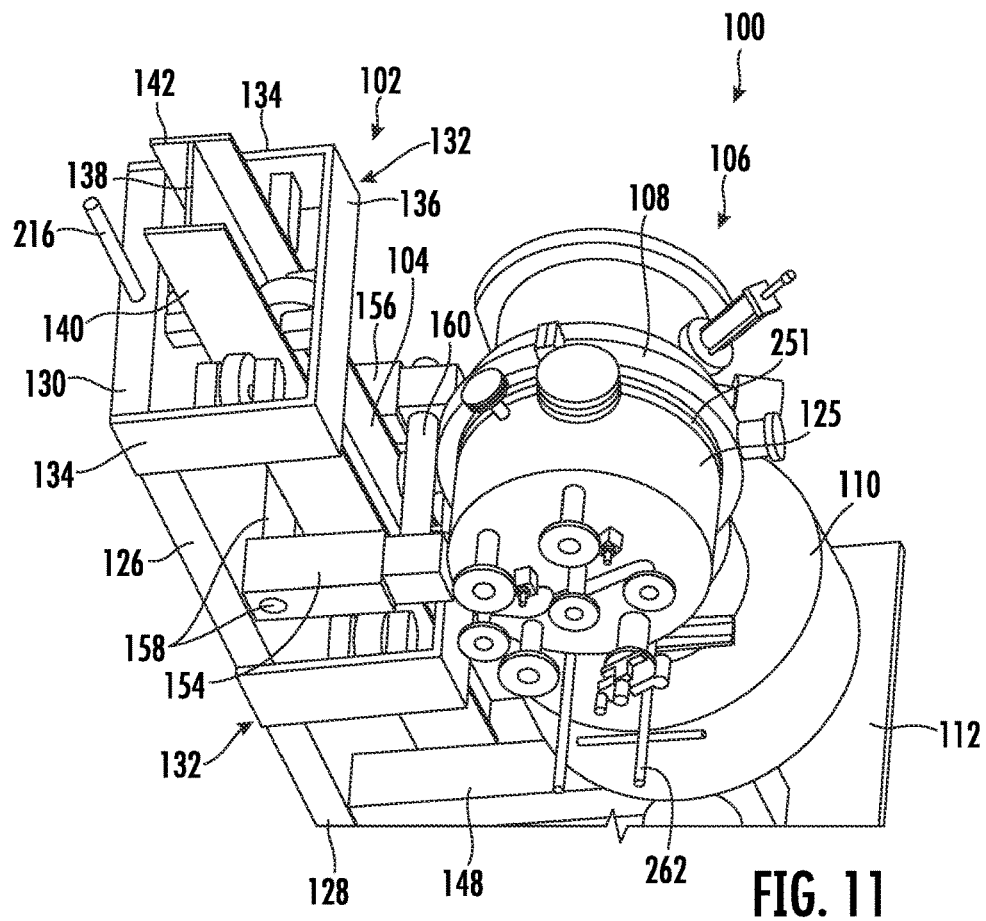
FIG. 11 illustrates perspective view of the lift system in accordance with embodiments of the present disclosure.

Referring now to FIGS. 6 through 8, various aspects of a lift system 100 for installation and/or removal of a combustion can 125 into (or out of) a combustion section 16 of a gas turbine 10 are illustrated. For example, FIG. 6 illustrates a slide assembly 102 and a rail 104 of the lift system 100, FIG. 7 illustrates the slide assembly 102 coupled to the rail 104 and a portable cart assembly 106 of the lift system 100, and FIG. 8 illustrates the fully assembled lift system 100 (in which the slide assembly 102 is coupled to the rail 104, and the portable cart assembly 106 is coupled to the slide assembly 102). FIGS. 6 through 8 illustrate the order in which the lift system may be assembled. For example, the slide assembly 102 may first be coupled to the rail 104 such that the slide assembly 102 is movable along the rail 104 (as shown by comparing FIG. 6, in which the slide assembly 102 is decoupled from the rail 104, with FIG. 7, in which the slide assembly 102 is coupled to the rail 104). Subsequently, as shown in FIGS. 7 and 8, the portable cart assembly 106, which carries the combustion can 125, may be moved into position adjacent to the slide assembly 102. As shown in FIG. 8, the portable cart assembly 106 may be coupled to the slide assembly 102 (e.g., via a pin connection as described below), such that the slide assembly 102 and the portable cart assembly 106 may move together along the rail 104 to lift the combustion can 125 into an installation position.

The lift system 100 may include the rail 104, the slide assembly 102, and the portable cart assembly 106. The portable cart assembly 106 may include a combustion can cradle assembly 108 coupled to a telescopic member 110. The combustion can cradle assembly 108 may be removably couplable to a combustion can 125 of the combustion section 16 of the gas turbine 10. The portable cart assembly 106 may further include a platform 112 and a removable back plate or wall 114 extending (e.g., generally perpendicularly) from the platform 112. In some embodiments, the telescopic member 110 may couple directly to the platform 112, and in such embodiments, a base of the telescopic member 110 may define a pin hole 120 through which a pin 150 of the slide assembly 102 extends to couple the portable cart assembly 106 to the slide assembly 102. Alternatively, in other embodiments, a base support may be disposed between the platform 112 and the telescopic member 110, and in such embodiments, the base support may define the pin hole 120 through which the pin 150 of the slide assembly 102 extends to couple the portable cart assembly 106 to the slide assembly 102.

One or more wheels 116 (such as caster wheels) may be coupled to the platform 112, and the removable back plate 114 may include a handle 118, such that the portable cart assembly 106 may be pushed by a user 124 along the floor 74. For example, the user 124 may first secure the combustion can 125 to be installed in the combustion can cradle assembly 108 of the portable cart assembly 106. Subsequently push the portable cart assembly 106 along the floor 74 to the slide assembly 102, and the portable cart assembly 106 may be secured to the slide assembly 102 to finish installing the combustion can 125 into the combustor assembly 40 of the combustion section 16 of the gas turbine 10.

Figure 12:
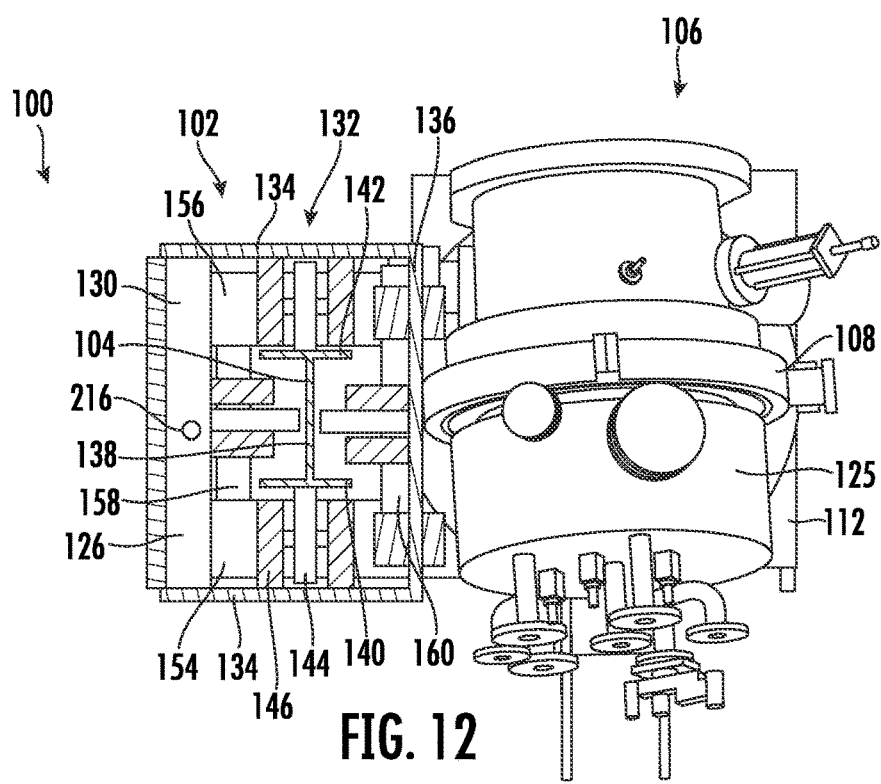
FIG. 12 illustrates a cross-sectional view of the lift system shown in FIG. 9 from along the section line 12-12 in accordance with embodiments of the present disclosure.

FIGS. 9 through 12 illustrate various views of the lift system 100 in accordance with embodiments of the present disclosure. Particularly, FIGS. 9 through 11 each illustrate perspective views of the lift system 100, and FIG. 12 illustrates a cross-sectional view of the lift system 100 from along the section 12-12 shown in FIG. 9. As shown in FIGS.

9 through 12, the slide assembly 102 may be removably couplable to the portable cart assembly 106 and the rail 104. Additionally, the slide assembly 102 may be movable with the portable cart assembly 106 along the rail 104 to adjust a position of the combustion can cradle assembly 108.

In exemplary embodiments, as shown in FIGS. 9 through 14, the slide assembly 102 may include a main plate 126 extending between a first end 128 and a second end 130. When the slide assembly 102 is coupled to the rail 104, the first end 128 may be proximate the floor, such that the main plate 126 may extend vertically from the first end 128 to the second end 130. The main plate 126 may be generally shaped as a rectangle having its longest sides generally parallel to a vertical direction (i.e., the direction of gravity), such that the main plate 126 is elongate in the vertical direction.

In various embodiments, as shown in FIGS. 9 and 10, the slide assembly 102 of the lift system 100 may further include one or more slidable couplings 132 extending from the main plate 126. The slidable couplings 132 may each surround the rail 104. The slidable couplings 132 may advantageously secure the slide assembly 102 to the rail 104 while allowing the slide assembly 102 to move along the rail 104. Particularly, the slidable couplings 132 and the main plate 126 may collectively surround the rail 104. In many embodiments, the slidable couplings 132 may each include two side walls 134 and an end wall 136. The two side walls 134 may each extend from the main plate 126 on either side of the rail 104, and the two side walls 134 may be oriented generally perpendicularly to the main plate 126. The end wall 136 may extend between the two side walls 134, and the end wall 136 may be generally parallel to the main plate 126. The main plate 126, the two side walls 134, and the end wall 136 of each slidable coupling 132 may collectively surround the rail 104 (i.e., define a rectangular shaped are through which the rail 104 extends). At least one of the slidable couplings 132 may extend from the second end 130 of the main plate 126. Particularly, the two side walls 134 of at least one slidable coupling 132 may extend from the second end 130 of the main plate 126. Additionally, at least one slidable coupling 132 may extend from the main plate 126 between the first end 128 and the second end 130 of the main plate 126 (e.g., at least one slidable coupling 132 may be centered on the main plate 126). Specifically, the two side walls 134 of at least one slidable coupling 132 may extend from the main plate 126 between the first end 128 and the second end 130 of the main plate 126.

In various embodiments, as shown in FIG. 12, the rail 104 may be an I-beam having a web 138, a first flange 140, and a second flange 142. The I-beam construction of the rail 104 may advantageously increase the structural integrity of the entire lift system 100. The first flange 140 and the second flange 142 may be spaced apart from one another, and the web 138 may extend between the first flange 140 and the second flange 142. In exemplary embodiments, the slide assembly 102 may include a plurality of wheels 144 rotatably engaged with the rail 104. Particularly, a bracket 146 may extend from each of the main plate 126, the two side walls 134, and the end wall 136, and a wheel 144 may be coupled to each bracket 146 (e.g., the bracket 146 may include two walls that extend on either side of the wheel 144 and a pin that extends through the center of the wheel between the two walls of the bracket). Each wheel 144 may be rotatably coupled to a respective bracket 146 on a separate side of the rail 104, such that each wheel 144 may be in rolling contact with a separate surface of the rail 104 (e.g., a separate surface of the I-beam rail).

In some embodiments, as shown in FIGS. 7 through 14, the telescopic member 110 may couple directly to the platform 112, and in such embodiments, a base of the telescopic member 110 may define a pin hole 120 through which a pin 150 of the slide assembly 102 extends to couple the portable cart assembly 106 to the slide assembly 102. Alternatively, in other embodiments, a base support may be disposed between the platform 112 and the telescopic member 110, and in such embodiments, the base support may define the pin hole 120 through which the pin 150 of the slide assembly 102 extends to couple the portable cart assembly 106 to the slide assembly 102.

In many embodiments, the slide assembly 102 further includes one or more connection members 148 extending from the first end 128 of the main plate 126. For example, the connection members 148 may include a first connection member and a second connection member spaced apart from one another such that a gap is defined therebetween. The connection members 148 may be generally parallel to one another and generally perpendicular to the main plate 126. In many embodiments, the connection members 148 may extend generally perpendicularly to the main plate 126, beyond the slidable couplings 132 to a terminal end. A pin 150 may extend through the one or more connection members 148 and the telescopic member 110 to rotatably couple the portable cart assembly 106 to the slide assembly 102. Specifically, the pin 150 may extend through the first connection member, telescopic member 110, and the second connection member. The pin 150 may be disposed closer to the terminal end of the connection members 148 than the main plate 126. The portable cart assembly 106 may be pivotable at the pin 150, such that a pivot point 152 is defined between the portable cart assembly 106 and the slide assembly 102 at the pin 150 about which the portable cart assembly 106 may rotate to adjust a position of the combustion can cradle assembly 108 and the combustion can 125.

Figure 13:
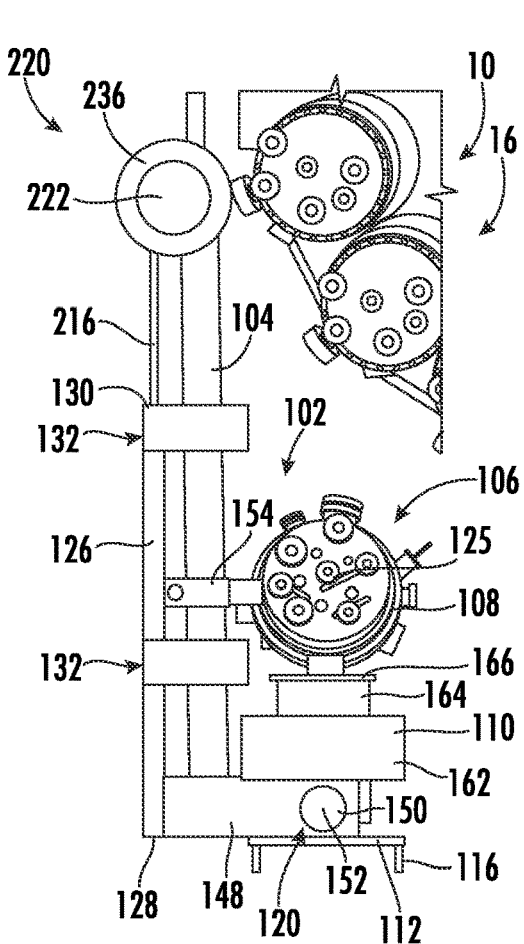
FIG. 13 illustrates an enlarged perspective view of a lift system in a retracted position in accordance with embodiments of the present disclosure.
Figure 14:
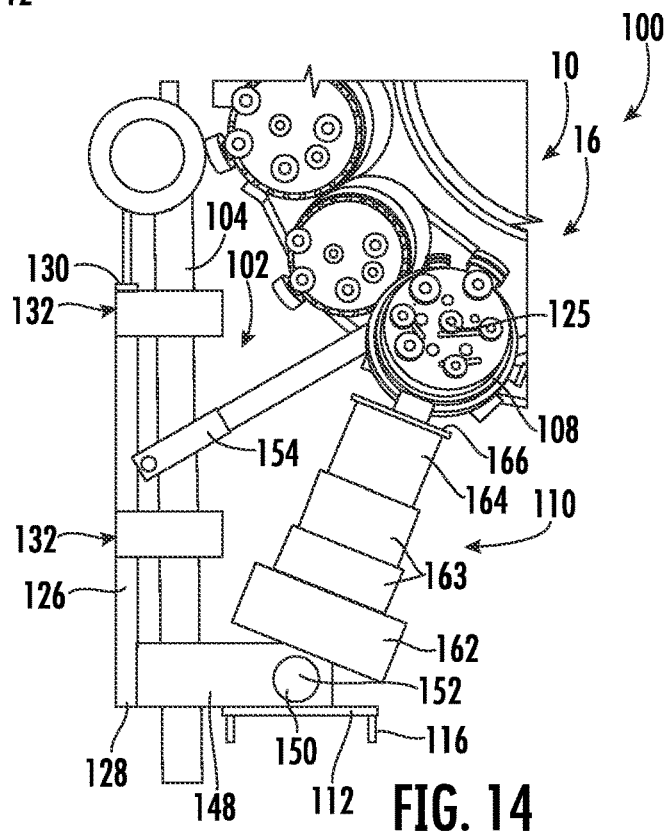
FIG. 14 illustrates an enlarged perspective view of a lift system in a partially extended position in accordance with embodiments of the present disclosure.

FIG. 13 illustrates an enlarged perspective view of a lift system 100 in a retracted position, and FIG. 14 illustrates an enlarged perspective view of a lift system 100 in an extended position to install a combustion can 125 (or remove a combustion can 125 from) the combustion section 16 of a gas turbine 10.

In exemplary embodiments, the telescopic member 110 may be a first telescopic member of the lift system. In such embodiments, the slide assembly 102 may include a second telescopic member 154 pivotably coupled to the main plate 126 and pivotably coupled to the combustion can cradle assembly 108. In some embodiments, the slide assembly 102 may further include a third telescopic member 156 pivotably coupled to the main plate 126 and pivotably coupled to the combustion can cradle assembly 108. The second and the third telescopic members 154, 156 may extend generally parallel to one another on either side of the rail 104. A first pin 158 may extend through the second telescopic member 154, the main plate 126 (e.g., directly through the main plate 126 or through a bracket extending from the main plate 126), and through the third telescopic member 156 to pivotably couple the second and third telescopic members 154, 156 to the main plate 126. Similarly, a second pin 160 may extend through the second telescopic member 154, the combustion can cradle assembly 108 (e.g., directly through the combustion can cradle assembly 108 or through a bracket extending from the combustion can cradle assembly 108), and through the third telescopic member 156 to pivotably couple the second and third telescopic members 154, 156 to the combustion can cradle assembly 108.

The first telescopic member 110, the second telescopic member 154, and the third telescopic member 156 may each be independently movable between a retracted position and an extended position. The first telescopic member 110, the second telescopic member 154, and the third telescopic member 156 may each included an actuatable hydraulic cylinder, pneumatic cylinder, or electric lift. The first telescopic member 110 may include one or more concentric cylinders that fit inside one another and are slidable relative to one another to extend the length of the first telescopic member 110. The one or more concentric cylinders may be hollow and have a hydraulic, pneumatic, or electric actuator disposed therein for extending and retracting the one or more concentric cylinders of the first telescopic member 110. Alternatively, the first telescopic member 110 may itself be a hydraulic, pneumatic, or electric actuator. For example, the first telescopic member 110 may include a base cylinder 162 (having the largest diameter of the concentric cylinders), one or more intermediate cylinders 163, and a top cylinder 164 (having the smallest diameter of the concentric cylinders). The top cylinder 164 may define a platform 166, and the combustion can cradle assembly 108 may be coupled to the platform 166 of the top cylinder 164 of the first telescopic member 110. Similarly, the second and third telescopic member 154, 156 may include concentric rectangular cuboids that fit inside one another and are slidable relative to one another to extend the length of the second and third telescopic member 154, 156. The one or more concentric rectangular cuboids may be hollow and have a hydraulic, pneumatic, or electric actuator disposed therein for extending and retracting the one or more the first and second telescopic members 154, 156. Alternatively, the second and third telescopic members 154, 156 may each themselves be a hydraulic, pneumatic, or electric actuator.

When in a retracted position, the first telescopic member 110 may be generally perpendicular to the second and the third telescopic members 154, 156. Additionally, the first telescopic member 110 may couple to the combustion can cradle assembly 108 in a position that is generally 90 degrees separated from where the second and the third telescopic members 154, 156 couple to the combustion can cradle assembly 108 (with respect to an axial centerline of the combustion can cradle assembly).

In many embodiments, the lift system 100 may further include a drive assembly 220 coupled to the rail 104. The drive assembly 220 may include a motor 222, a gearbox 236, one or more sprockets 232, and a drive chain 216 coupled to the slide assembly 102 and the motor 222 such that operation of the motor 222 moves the slide assembly 102 along the rail 104. For example, the drive assembly 220 may include a motor 222 coupled to the drive chain 216, such that operation of the motor 222 adjusts a linear position of the slide assembly 102 along the rail 104 (e.g., operation of the motor 222 may translate the slide assembly 102 along the rail 104). Operation of the motor 222 may be halted once the slide assembly 102 reaches the desired height.

In exemplary embodiments, the drive chain 216 may be a metal roller chain (such as a steel bush roller chain) having a plurality of inner links, outer links, and rollers. In various implementations, the drive assembly 220 may include one or more sprockets 232 rotatably coupled to the drive chain 216. Particularly, the one or more sprockets 232 may be coupled to the drive chain 216 such that a rotation of the sprocket 232 causes translational movement of the drive chain 216.

In many embodiments, the drive assembly 220 may include a motor 222 (such as an electric motor, a hydraulic motor, gas motor, or other suitable motor for powering the drive assembly 220). The motor 222 may be connected to a gearbox 236. The gearbox 236 may be connected to the motor 222 and connected to the one or more sprockets 232. For example, the gearbox 236 may include an input shaft connected to an output shaft of the motor 222. Additionally, the gearbox 236 may include an output shaft coupled to the sprocket 232, and the sprocket 232 may be coupled to the drive chain 216 such that operation of the motor 222 alters a linear position of the slide assembly 102 (and/or the portable cart assembly 106) along the rail 104.

The gearbox 236 may function to transform a rotational input (e.g., input speed and torque) provided by the motor 222 to a desired rotational output (e.g., output speed and torque). Alternatively, the drive assembly 220 may be a direct drive system (e.g., not having a gearbox), such that the output shaft of the motor 222 is directly coupled to the one or more sprockets 232. The one or more sprockets 232 may be coupled to the drive chain 216.

Figure 15:
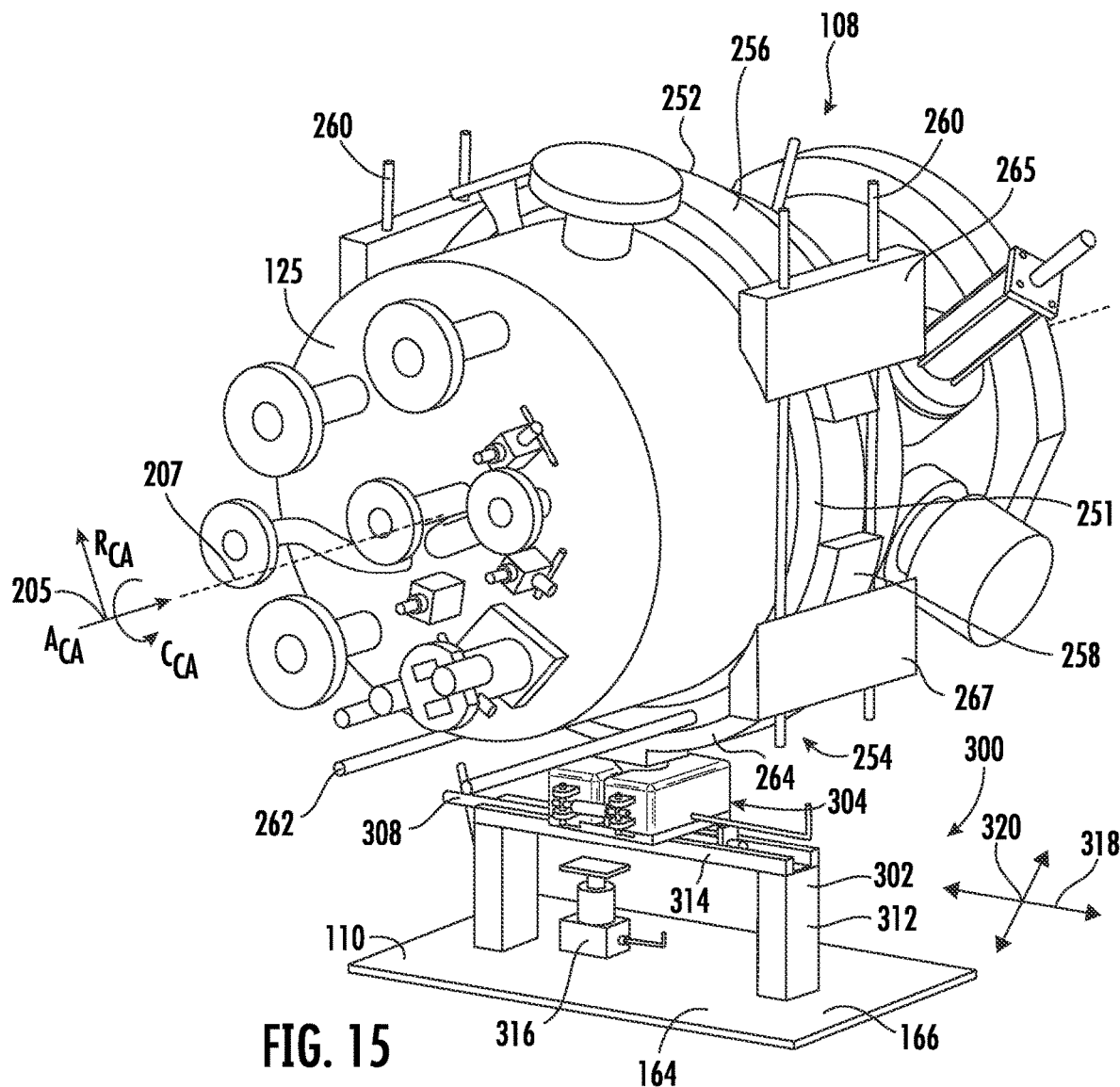
FIG. 15 illustrates an enlarged perspective view of a combustion can cradle assembly carrying a combustion can in accordance with embodiments of the present disclosure.

FIG. 15 illustrates an enlarged perspective view of a combustion can cradle assembly 108 carrying a combustion can 125 in accordance with embodiments of the present disclosure. As shown, the combustion can cradle assembly 108 may define a cylindrical coordinate system 205 having an axial direction $A_{CA}$ extending along an axial centerline 207 of the combustion can cradle assembly 108, a radial direction $R_{CA}$ extending perpendicularly to the axial centerline 207 of the combustion can cradle assembly 108, and a circumferential direction $C_{CA}$ extending around the axial centerline 207 of the combustion can cradle assembly 108. When the combustion can cradle assembly 108 is coupled to a combustion can 125, the axial centerline 207 of the combustion can cradle assembly 108 may coincide with an axial centerline of the combustion can 125 (such that they share a common axial centerline). The combustion can cradle assembly 108 may be configured to move the along any of the axial direction $A_{CA}$, the radial direction $R_{CA}$, and/or the circumferential direction $C_{CA}$ to adjust a position of the combustion can 125 contained therein (e.g., relative to the slide assembly 102, the rail 104, and/or the gas turbine 10).

As shown in FIG. 15, the combustion can cradle assembly 108 includes an annular ring 251, an upper assembly 252, a lower assembly 254, and one or more threaded rods 260 extending between the upper assembly 252 and the lower assembly 254. The annular ring 251 may extend annularly around the axial centerline 207 and may be sized to surround a combustion can 125. For example, the annular ring 251 may be sized such that an inner diameter or surface of the annular ring 251 forms a friction fit with an outer surface of the combustion can 125, such that the combustion can 125 can be inserted into the annular ring 251 and securely coupled thereto via the friction fit.

Figure 16:
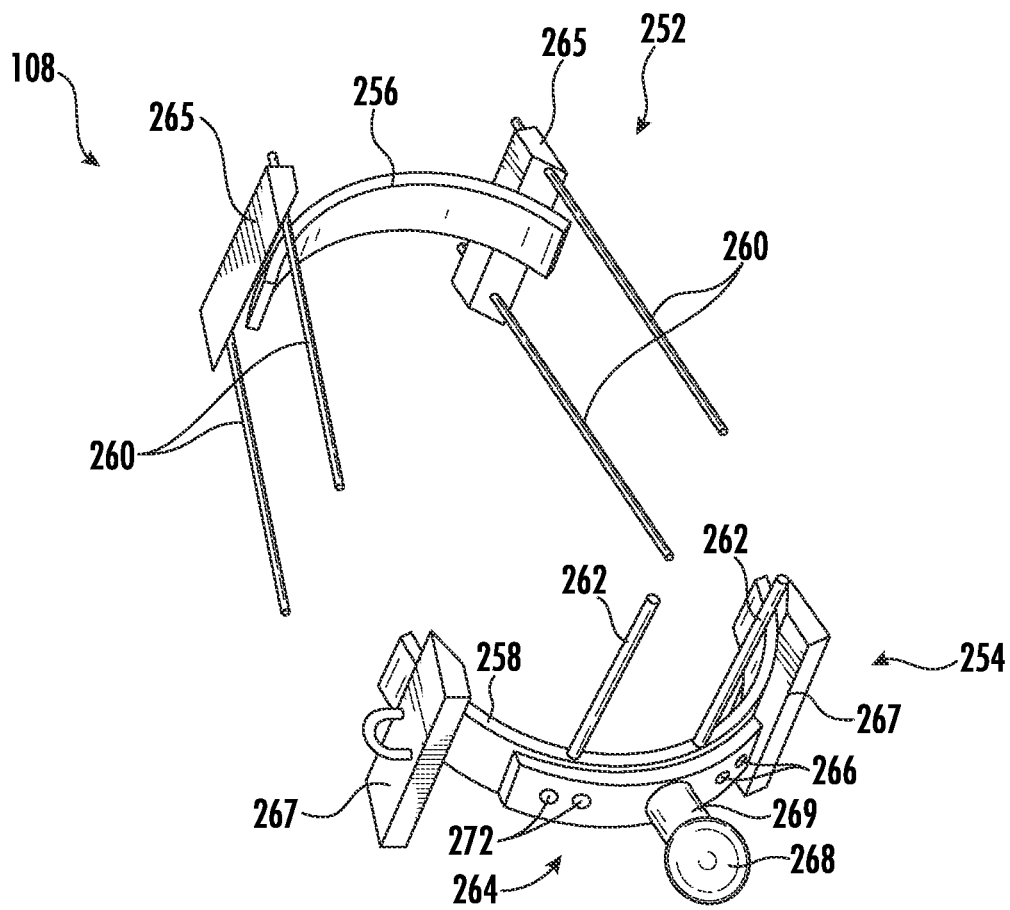
FIG. 16 illustrates an exploded view of a combustion can cradle assembly in accordance with embodiments of the present disclosure.

FIG. 16 illustrates an exploded view of the combustion can cradle assembly 108, in which the annular ring 251 is removed to provide perspective, in accordance with embodiments of the present disclosure. As shown in FIGS. 15 and 16 collectively, the combustion can cradle assembly 108 may include an upper assembly 252, a lower assembly 254, and one or more threaded rods 260. The upper assembly 252 may include an upper pressure plate 256 and an upper connection member 265, and the lower assembly 254 may include a lower pressure plate 258 and a lower connection member 267. As shown, both the upper pressure plate 256 and the lower pressure plate 258 may extend partially along the circumferential direction $C_{CA}$ of the combustion can cradle assembly 108. For example, both the upper pressure plate 256 and the lower pressure plate 258 may be contoured to correspond with a combustion can 125, to provide for flush contact between the upper and lower pressure plates 258 and annular ring 251.

In many embodiments, as shown in FIG. 16, the upper assembly 252 and the lower assembly 254 may be spaced apart from one another (e.g., spaced apart in the radial direction $R_{CA}$). In many embodiments, the one or more threaded rods 260 may extend between, and couple to, the upper assembly 252 and the lower assembly 254. In particular embodiments, the one or more threaded rods 260 extends between the upper connection member 265 and the lower connection member 267. As shown in FIG. 16, the upper connection member 265 and the lower connection member 267 may extend generally axially with respect to the axial centerline 207 of the combustion can cradle assembly 108.

In particular embodiments, the combustion can cradle assembly 108 may include four threaded rods 260 extending between the upper assembly 252 and the lower assembly 254 (e.g., two threaded rods 260 on either side of the combustor can). In other embodiments (not shown), the cradle assembly 108 may include more or less than four threaded rods 260 (such as 2, 5, 6, or up to 10) and should not be limited to any particular number of threaded rods 260 unless specifically recited in the claims. Each of the threaded rods 260 may be coupled on both ends (e.g., coupled to the upper connection member 265 at a first end and coupled to the lower connection member 267 at a second end), such that rotation of the threaded rods 260 alters the distance between the upper and lower assemblies (e.g., a distance along the radial direction $R_{CA}$). In this way, rotation of the threaded rods 260 in a first direction may increase the radial distance between the upper and lower pressure plates 256, 258 (which may allow a combustion can 125 to be removed from the combustion can cradle assembly 108). Similarly, rotation of the threaded rods 260 in a second direction may decrease the radial distance between the upper and lower pressure plates 256, 258 (which may allow a combustion can 125 to be coupled to the combustion can cradle assembly 108).

Figure 17:
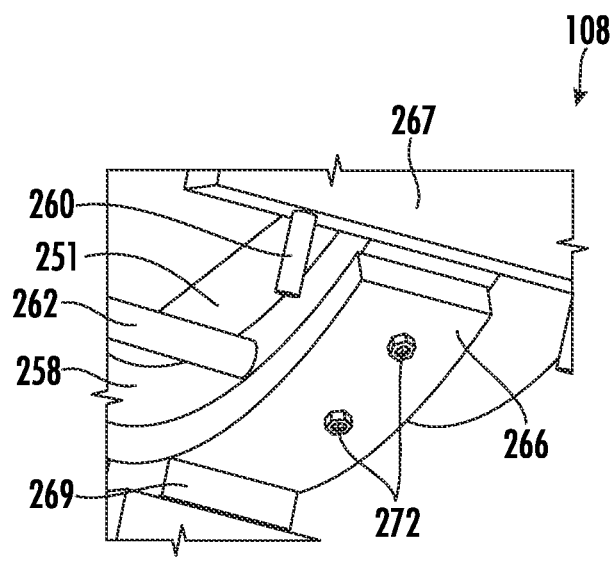
FIG. 17 illustrates an enlarged perspective view of a combustion can cradle assembly in accordance with embodiments of the present disclosure.

In many embodiments, as shown in FIGS. 15 and 16, the combustion can cradle assembly 108 may include one or more handle bars 262 (such as at least two handle bars 262 in exemplary embodiments). Particularly, the lower assembly 254 may include one or more handle bars 262 extending from the lower pressure plate 258. Additionally, as shown best in FIG. 16, the lower assembly 254 may further include a ball member 264 coupled to the lower pressure plate 258. The ball member 264 may include a plate portion 266 coupled to the lower pressure plate 258, a ball portion 268, and a neck portion 269 extending between the plate portion 266 and the ball portion 268. The ball portion 268 may be a sphere. In exemplary embodiments, one or more threaded fasteners 272 (such as bolts, nuts, screws, or other suitable threaded fasteners) may couple the plate portion 266 of the ball member 264 to the lower pressure plate 258. For example, FIG. 17 illustrates an enlarged perspective view of the combustion can cradle assembly 108 in accordance with embodiments of the present disclosure. As shown, two threaded fasteners 272 may extend through the plate portion 266 of the ball member 264 and into the lower pressure plate 258. As shown in FIG. 16, two threaded fasteners 272 may extend through the plate portion 266 of the ball member 264 on either side of the neck portion 269 (and/or the ball portion 268) of the ball member 264. In exemplary embodiments the one or more handle bars 262 may extend generally axially (e.g., with respect to the axial direction $A_{CA}$) from the lower pressure plate 258 to a respective terminal end. Each of the one or more handle bars 262 may be generally cylindrically shaped.

Referring back to FIG. 15, the lift system 100 may further include a fine movement assembly 300 coupling the telescopic member 110 to the combustion can cradle assembly 108. Specifically, the fine movement assembly 300 may extend between the ball member 264 and the platform 166 of the top cylinder 164 of the first telescopic member 110. The fine movement assembly 300 may advantageously allow for fine movements of the combustion can 125 in any of the axial direction $A_{CA}$, the radial direction $R_{CA}$, and/or the circumferential direction $C_{CA}$ in order to align the combustion can 125 with the opening in which it is to be inserted into in the combustion section 16.

In many embodiments, the fine movement assembly 300 may include a track 302, a clamping assembly 304 defining a socket 306 and coupled to the track 302 via a threaded track rod 308. The ball member 264 coupled to the lower assembly 254 and extending into the socket 306 to form a joint 310 with the clamping assembly 304. In various embodiments, the track 302 may include legs 312 and a track member 314. The legs 312 may be spaced apart from one another and extend between the platform 166 and the track member 314. The track member 314 may extend between the legs 312. In many embodiments, the legs 312 may extend generally radially (with respect to the radial direction $R_{CA}$), and the legs 312 may be extendable in the radial direction $R_{CA}$. For example, the legs 312 may be telescopic or otherwise capable of extending and retracting along the radial direction $R_{CA}$ to adjust a radial position of the combustion can 125. For example, in many embodiments, the fine movement assembly 300 may further include a jack assembly 316 extending between the platform 166 and the track member 314. In some implementations, the jack assembly 316 may be a mechanical jack that employs a screw and a threaded tube. In such embodiments, the screw may be manually turned to adjust the height of the track member 314 and thereby a radial position of the combustion can 125. In other embodiments, the jack assembly 316 may be a hydraulic jack. In such embodiments, the jack assembly may include a hydraulic pump connected to the hydraulic jack such that operation of the pump raises and lowers the track member 314.

Figure 18:
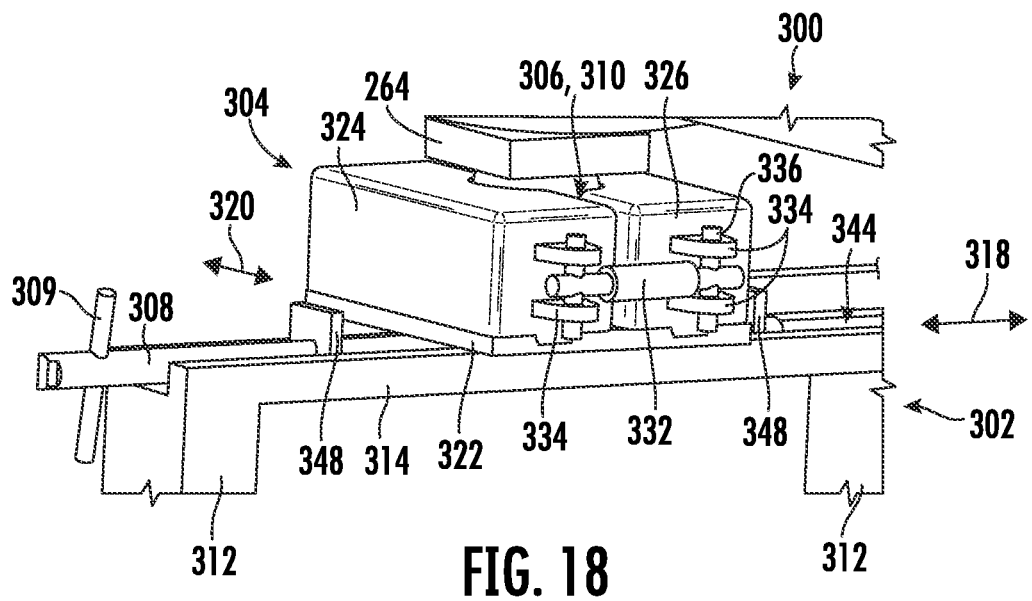
FIG. 18 illustrates a perspective view of a fine movement assembly in accordance with embodiments of the present disclosure.
Figure 19:
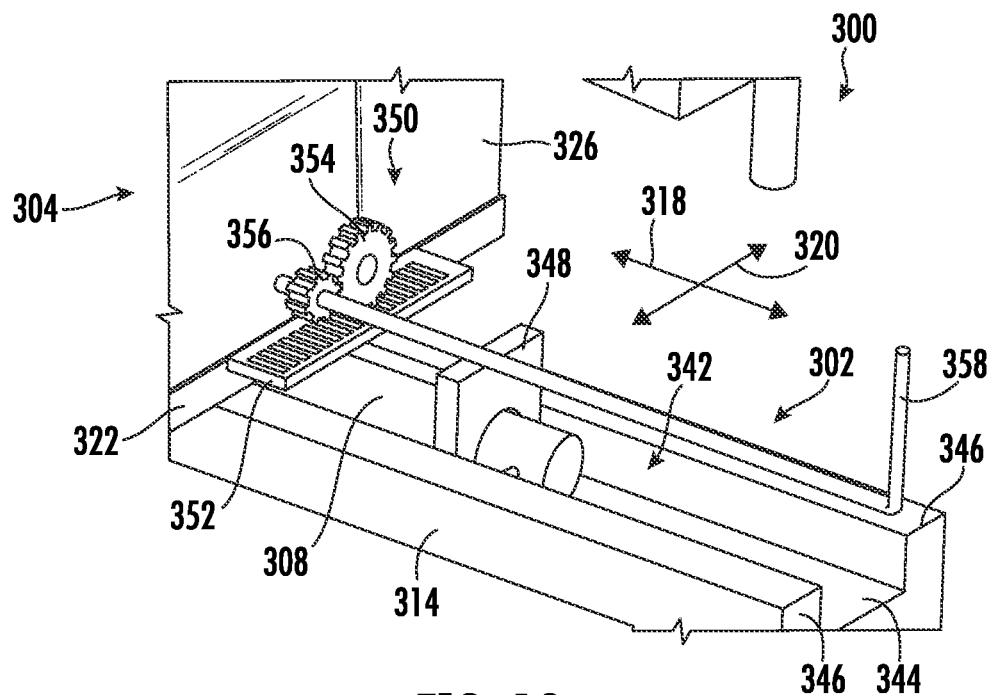
FIG. 19 illustrates a perspective view of a fine movement assembly in accordance with embodiments of the present disclosure.
Figure 20:
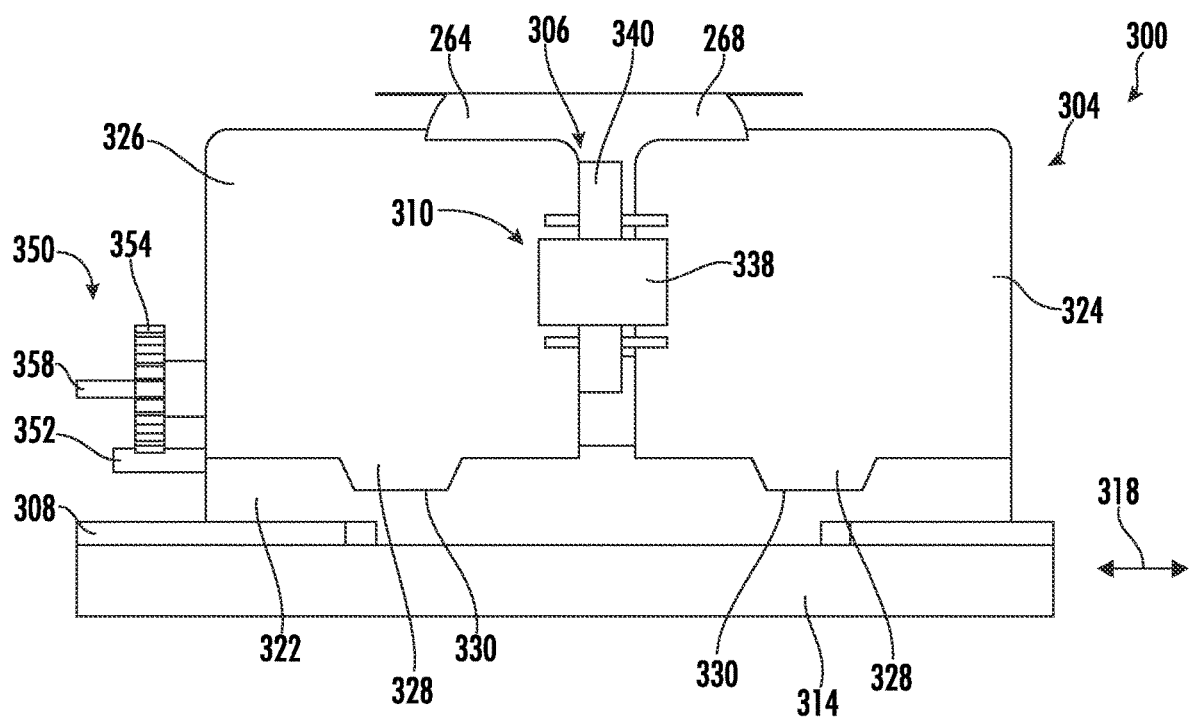
FIG. 20 illustrates a perspective view of a fine movement assembly in accordance with embodiments of the present disclosure.

FIGS. 18 through 20 each illustrate a different perspective view of the fine movement assembly 300 in accordance with embodiments of the present disclosure. As shown, the fine movement assembly 300 may be configured to move (e.g., translate) the combustion can cradle assembly 108 (thereby moving the combustion can 125 contained therein) in a first direction 318 and/or in a second direction 320. The first direction 318 and the second direction 320 may be mutually perpendicular to one another. Additionally, the combustion can cradle assembly 108 may be rotatable about the joint 310 (i.e., the ball socket joint) formed between the ball portion 268 of the ball member 264 and the socket 306 of the clamping assembly 304 to adjust a position of the combustion can 125.

In exemplary embodiments, the clamping assembly further comprises a base plate 322, a first clamping member 324, and a second clamping member 326. For example, as shown in FIG. 20, the first clamping member 324 and the second clamping member 326 may be slidably coupled to the base plate 322 via a tongue 328 and groove 330. For example, the first clamping member 324 and the second clamping member 326 may each be slidable in the second direction 320 relative to the base plate 322 due to the orientation of the tongue 328 and corresponding groove 330. For example, both the tongue 328 and the groove 330 may be elongated and extend generally linearly along the second direction 320, such that the first and second clamping member 324, 326 are slidable relative to the base plate 322. In exemplary implementations, as shown, both the first and the second clamping members 326 may define an inner surface that contacts the base plate 322, and a tongue 328 may extend from each of the inner surfaces into a corresponding groove 330 defined in the base plate 322. In alternate embodiments, the clamping members 324, 326 may define the groove and the base plate 322 may define the tongue.

In various embodiments, one or more pins 332 may secure the first clamping member 324 and the second clamping member 326 to one another. For example, as shown in FIG. 18 two flanges 334 may extend from each of the first clamping member 324 and the second clamping member 326, and the pin 332 may extend along the first direction 318 from between the two flanges 334 of the first clamping member 324 to between the two flanges 334 of the second clamping member 326. A rod 336 may extend through the two flanges 334 and the pin 332 at the first clamping member 324 and the second clamping member 326. Additionally, or alternatively, as shown in FIG. 20, a flange or hinge 338 may extend between the first and the second clamping members 324, 326, and a pin 340 may extend (e.g., generally radially) through the hinge 338.

In many embodiments, as shown in FIGS. 18 and 19, the track member 314 of the track 302 may define a trench 342 extending along the first direction 318. For example, the track member 314 may include a floor 344, and side walls 346 may extend from the floor 344. The side walls 346 may be spaced apart from one another, such that the trench 342 is defined between the side walls 346. One or more flanges 348 may extend within the trench 342 between the side walls 346 and along the floor 344 (e.g., a flange 348 may be disposed on either side of the clamping assembly 304). The threaded track rod 308 may be disposed within the trench 342, and the threaded track rod 308 may extend through (and threadably engage) the one or more flanges 348 and the base plate 322 of the clamping assembly 304. In this way, rotation of the threaded track rod 308, e.g., via handle 309, may move the clamping assembly 304 in the first direction 318, thereby adjusting a position of the combustion can cradle assembly 108 and the combustion can 125.

As shown in FIG. 19, the fine movement assembly 300 may further include a rack and pinion assembly 350. The rack and pinion assembly 350 may include a rack 352, a gear 354 engaged with the rack 352, and a pinion 356 engaged with the gear 354. As used herein, "engaged: may mean that the teeth of the rack 352 interface with the teeth of the gear 354, and the teeth of the gear 354 interface with the teeth of the pinion 356, such that rotation of the pinion 356 causes the gear 354 to rotate thereby causing the rack 352 to translate along the second direction 320. The gear 354 and the pinion may be coupled (e.g., rotatably) to one of the first clamping member 324 or the second clamping member 326, and the rack may be coupled (e.g., fixedly via a weld) to the base plate 322. A rod 358 may extend from, and couple to, the pinion 356, such that rotation of the rod 358 also rotates the pinion 356, which rotates the gear 354, thereby causing the rack 352 and clamping assembly 304 to translate along the second direction 320. For example, operation of the rack and pinion assembly 350 may cause the first and second clamping members 324, 326 to slide relative to the base plate 322 (e.g., along the tongue and groove), thereby allowing for positional adjustments of the combustion can cradle assembly 108 and/or the combustion can 125 in the second direction 320.

Figure 21:
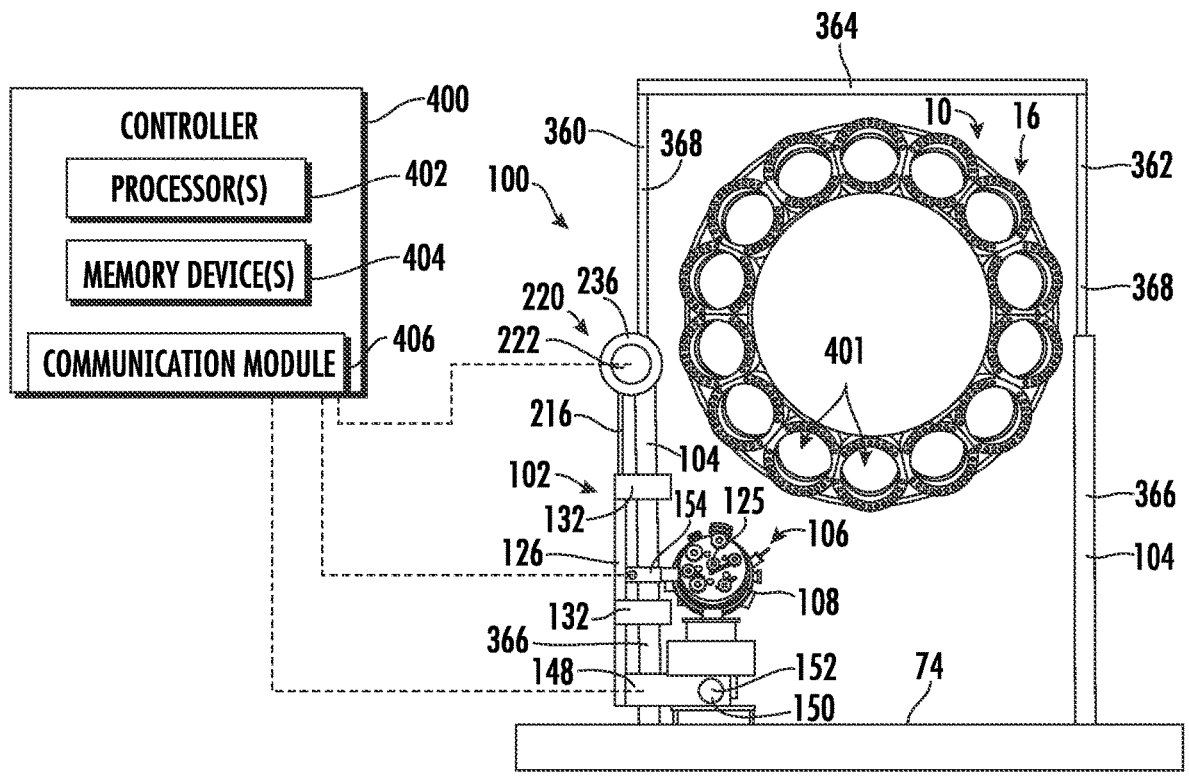
FIG. 21 illustrates a turbomachine and a lift system in a retracted position in accordance with embodiments of the present disclosure.
Figure 22:
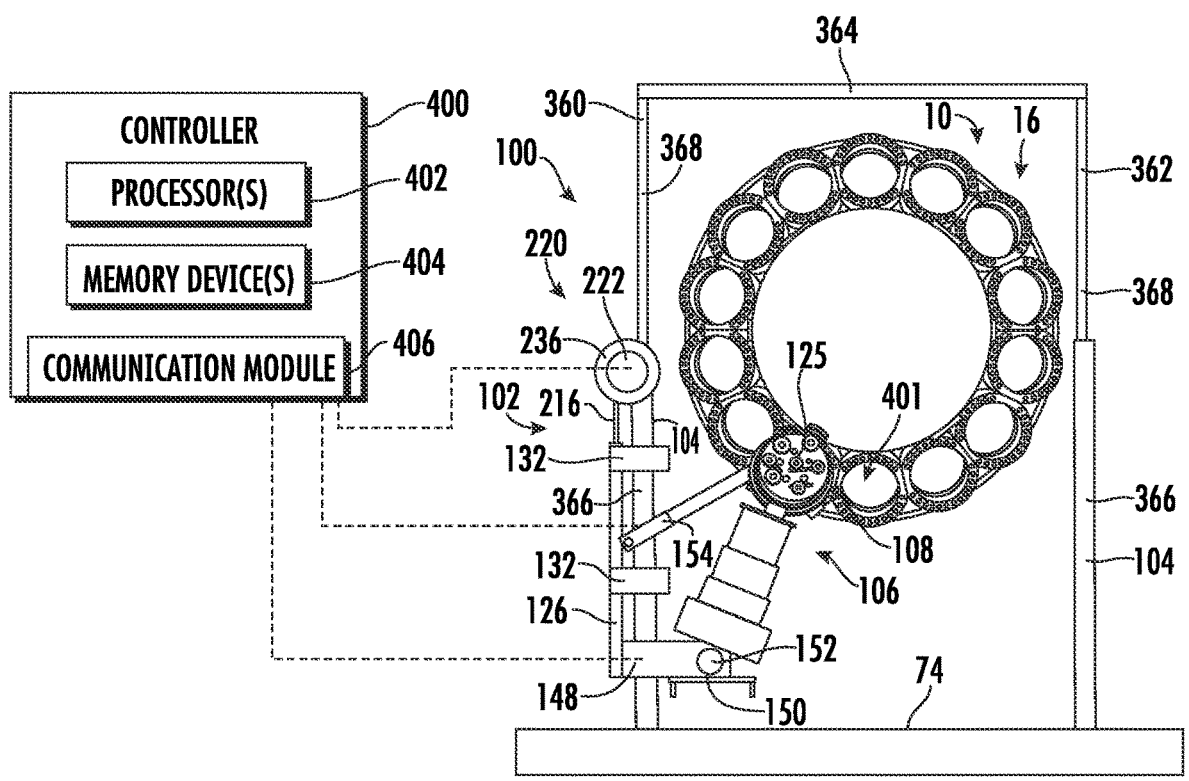
FIG. 22 illustrates a turbomachine and a lift system in a partially extended position in accordance with embodiments of the present disclosure.

FIGS. 21 and 22 each illustrate the lift system 100 and a combustion section 16 of a gas turbine 10, in accordance with embodiments of the present disclosure. For example, FIG. 21 illustrates the lift system 100 in a retracted position, and FIG. 22 illustrates the lift system 100 in a partially extended position.

In many embodiments, as shown, the rail 104 may extend at least partially around the gas turbine 10, such that the floor 74 and the rail 104 collectively surround the gas turbine 10. The rail 104 may include a first column 360, a second column 362, and a cross-beam 364 extending between the first column 360 and the second column 362. The first column 360 and the second column 362 may extend generally vertically (e.g., parallel to the floor 74 and aligned with the direction of gravity), and the crossbeam 364 may extend generally perpendicularly to the first column 360 and the second column 362 (e.g., horizontally or at least partially parallel to the floor 74). In this way, the rail 104 and the floor 74 may collectively surround the turbomachine.

The first column 360 and the second column 362 may each include a first portion 366 and a second portion 368. The first portion 366 may extend from the floor 74 to the second portion 368, and the second portion 368 may extend between the first portion 366 and the cross-beam 364. The first portion 366 may be thicker than the second portion 368. The motor 222 of the drive assembly 220 (and/or the entire drive assembly 220) may be removably secured to the first portion 366 of either the first column 360 or the second column 362 (e.g., near the junction between the first portion 366 and the second portion 368), such that the drive assembly 220 is coupled to the thicker portion of the rail 104 for increased structural support.

In many embodiments, the rail 104 may be formed from one or more I-beams (e.g., the first column 360 and the second column 362 may each be formed from one or more I-beams extending between the floor or ground and the cross-beam 364). In exemplary embodiments, the rail 104 of the lift system 100 may be the one or more rail supports 75 discussed above with reference to FIG. 5, such that the lift system 100 is capable of being used with existing gas turbine hardware. For example, the rail supports 75 may support one or more piping's, fluid conduits, and or provide structural support for the gas turbine 10.

Still referring to FIGS. 21 and 22, a controller 400 is shown as a block diagram to illustrate the suitable components that may be included within the controller 400. As shown, the controller 400 may include one or more processor(s) 402 and associated memory device(s) 404 configured to perform a variety of computer-implemented functions (e.g., performing the methods, steps, calculations and the like and storing relevant data as disclosed herein). Additionally, the controller 400 may also include a communications module 406 to facilitate communications between the controller 400 and the various components of the lift system 100. For example, the communications module 406 may be in operable communication with the drive assembly 220 (such as the motor 222 of the drive assembly 220), such that the controller 400 may start, stop, and control the speed of the motor 222. Further, the communications module 406 may be in communication with the first telescopic member 110, the second telescopic member 154, and/or the third telescopic member 156, such that the controller 400 may independently actuate the first telescopic member 110, the second telescopic member 154, and/or the third telescopic member 156 to adjust a position of the combustion can 125 and align the combustion can 125 with a respective opening 401 of the combustion section 16 for installation therein.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 404 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 404 may generally be configured to store suitable computer-readable instructions that, when implemented by the processor(s) 402, configure the controller 400 to perform various functions and/or operations including, but not limited to, actuating the telescopic member(s) and/or operating the drive assembly.

Figure 23:
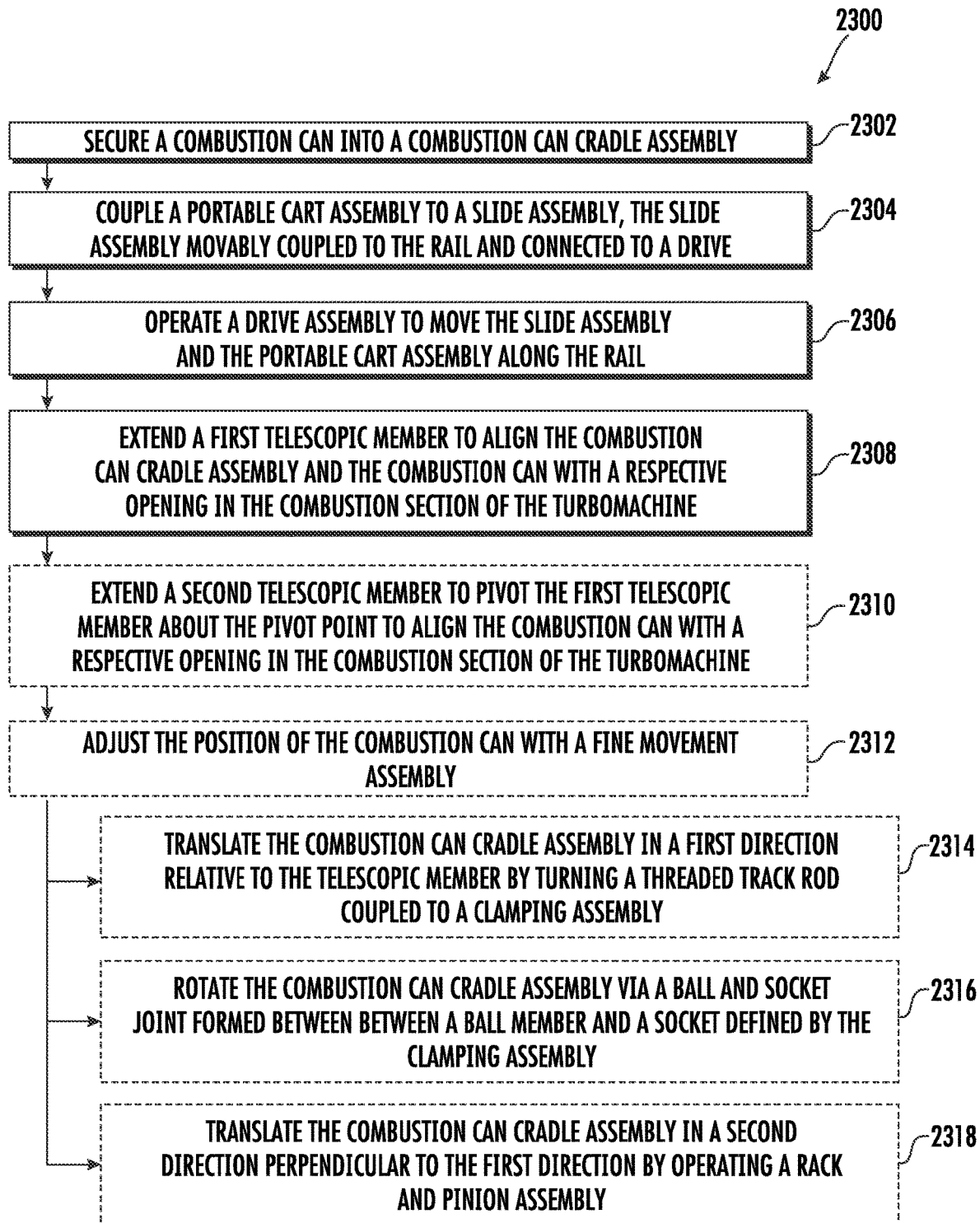
FIG. 23 is a flow chart of a method for installation of a combustion can into a combustion section of a turbomachine in accordance with embodiments of the present disclosure.

Referring now to FIG. 23, a flow diagram of one embodiment of a method 2300 for installation of a combustion can 125 into a combustion section 16 of a turbomachine is illustrated in accordance with aspects of the present subject matter. In general, the method 2300 will be described herein with reference to the gas turbine and the lift system 100 described above with reference to FIGS. 1 through 22. However, it will be appreciated by those of ordinary skill in the art that the disclosed method 2300 may generally be utilized with any suitable gas turbine and/or may be utilized in connection with a system having any other suitable system configuration. In addition, although FIG. 23 depicts steps performed in a particular order for purposes of illustration and discussion, the methods discussed herein are not limited to any particular order or arrangement unless otherwise specified in the claims. One skilled in the art, using the disclosures provided herein, will appreciate that various steps of the methods disclosed herein can be omitted, rearranged, combined, and/or adapted in various ways without deviating from the scope of the present disclosure.

In many implementations, the method 2300 may include at (2302) securing the combustion can 125 into a combustion can cradle assembly 108. The combustion can cradle assembly 108 may form a part of a portable cart assembly 106 that includes a telescopic member 110 coupled to the combustion can cradle assembly 108. Securing at (2302) may include inserting the combustion can 125 into the combustion can cradle assembly 106. For example, the combustion can 125 may be inserted into the annular ring 251. Subsequently, the upper pressure plate 256 and lower pressure plate 258 may be tightened about the annular ring 251 by turning the threaded rods 260 to decrease the distance between the upper and lower pressure plates 256, 258.

In some implementations, the portable cart assembly 106 may need to be translated along the floor 74 in order to be adjacent to the slide assembly 102 for subsequent coupling thereto. In such embodiments, a user 124 may push the portable cart assembly 106 via the handle 118. That is, the portable cart assembly 106 may be translated along the floor 74 by rolling the portable cart assembly 106 on the wheels 116. Once the portable cart assembly 106 is positioned adjacent to the slide assembly 102 and the rail 104, the method 2300 may further include at (2304) coupling the portable cart assembly 106 to a slide assembly 102. The slide assembly 102 may be movably coupled to the rail 104 and connected to a drive assembly 220. Coupling at (2304) may include inserting a pin 150 through the one or more connection members 148 and the telescopic member 110 to rotatably couple the portable cart assembly 106 to the slide assembly 102. Specifically, the pin 150 may be inserted through the first connection member, telescopic member 110, and the second connection member. In some implementations, the slide assembly 102 may need to be coupled (or connected) to the rail 104 prior to the portable cart assembly 106 being coupled to the slide assembly 102.

In many implementations, the method 2300 may further include at (2306) operating a drive assembly 220 to move the slide assembly 102 and the portable cart assembly 106 along the rail 104. For example, the drive assembly 220 may include a motor 222 coupled to a drive chain 216 (and the drive chain 216 may be coupled to the slide assembly 102), such that operation of the motor 222 adjusts a linear position of the slide assembly 102 along the rail 104 (e.g., operation of the motor 222 may translate the slide assembly 102 along the rail 104). Operation of the motor 222 may be halted once the slide assembly 102 reaches the desired height along the rail 104.

In various implementations, the method 2300 may further include at (2308) extending the telescopic member 110 to align the combustion can cradle assembly 108 and the combustion can 125 with a respective opening 401 in the combustion section 16 of the turbomachine. For example, the telescopic member 110 may be extended until the combustion can 125 is aligned with the respective opening 401, such that the bolt holes in the flange 46 of the combustion casing 42 align with the bolt holes in the flange of the combustion can 125. Extending the telescopic member 110 at (2308) may further include actuating the telescopic member 110 (which may be a hydraulic or pneumatic actuator).

In various embodiments, the telescopic member may be a first telescopic member 110, and the slide assembly 102 may further include a second telescopic member 154 extending from a main plate 126 of the slide assembly 102 to the combustion can cradle assembly 106. In such embodiments, the method 2300 may further include an optional step at (2310) of extending the second telescopic member 154 to pivot the first telescopic member 110 about the pivot point 152 to align the combustion can 125 with a respective opening 401 in the combustion section 16 of the turbomachine.

In exemplary embodiments, a fine movement assembly 300 couples the telescopic member 110 to the combustion can cradle assembly 108. In such embodiments, the method 2300 may further include an optional step at (2312) of adjusting the position of the combustion can 125 within fine movement assembly. Adjusting at (2312) may include at (2314) translating the combustion can cradle assembly 108 in a first direction 318 relative to the telescopic member 110 by turning a threaded track rod 308 coupled to a clamping assembly 304. The threaded track rod 308 may be disposed in a track 302. The clamping assembly 304 may be coupled to the combustion can cradle assembly 108. Adjusting at (2312) may include at (2316) rotating the combustion can cradle assembly 108 assembly via a ball and socket joint 310 formed between a ball member 264 and a socket 306 defined by the clamping assembly 304. The ball member 264 may be coupled to the combustion can cradle assembly 108. Adjusting at (2312) may include at (2318) translating the combustion can cradle assembly 108 in a second direction 320 perpendicular to the first direction 318 by operating a rack and pinion assembly 350.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A lift system for installation and removal of a combustion can from a turbomachine, the lift system comprising: a rail; a portable cart assembly comprising a combustion can cradle assembly coupled to a telescopic member, the combustion can cradle assembly configured to removably couple to a combustion can of the turbomachine; a slide assembly removably couplable to the portable cart assembly and the rail, the slide assembly movable with the portable cart assembly along the rail to adjust a position of the combustion can cradle assembly.

The lift system as in any of the preceding clauses, further comprising a drive assembly coupled to the rail, the drive assembly including a motor, a gearbox, one or more sprockets, and a drive chain coupled to the slide assembly and the motor such that operation of the motor moves the slide assembly along the rail.

The lift system as in any of the preceding clauses, wherein the slide assembly comprises a main plate extending between a first end and a second end.

The lift system as in any of the preceding clauses, wherein the slide assembly further comprises one or more slidable couplings extending from the main plate, the one or more slidable couplings surrounding the rail.

The lift system as in any of the preceding clauses, wherein the slide assembly further includes one or more connection members extending from the first end of the main plate, and wherein a pin extends through the one or more connection members and the telescopic member to rotatably couple the portable cart assembly to the slide assembly.

The lift system as in any of the preceding clauses, wherein the telescopic member is a first telescopic member, and wherein the slide assembly further includes a second telescopic member pivotably coupled to the main plate and pivotably coupled to the combustion can cradle assembly.

The lift system as in any of the preceding clauses, wherein the combustion can cradle assembly defines a cylindrical coordinate system having an axial direction, a radial direction, and a circumferential direction, and wherein the combustion can cradle assembly is configured to move along any of the axial direction, the radial direction, or the circumferential direction.

The lift system as in any of the preceding clauses, wherein the combustion can cradle assembly comprises an annular ring, an upper assembly, a lower assembly, and one or more threaded rods extending between the upper assembly and the lower assembly.

The lift system as in any of the preceding clauses, wherein the upper assembly includes an upper pressure plate and an upper connection member, wherein the lower assembly includes a lower pressure plate and a lower connection member, and wherein the one or more threaded rods extends between the upper connection member and the lower connection member.

The lift system as in any of the preceding clauses, wherein the lower assembly includes one or more handle bars extending from the lower pressure plate.

The lift system as in any of the preceding clauses, further comprising a fine movement assembly coupling the telescopic member to the combustion can cradle assembly.

The lift system as in any of the preceding clauses, wherein the fine movement assembly comprises a track, a clamping assembly defining a socket and coupled to the track via a threaded track rod, a ball member coupled to the lower assembly and extending into the socket to form a joint with the clamping assembly.

The lift system as in any of the preceding clauses, wherein the clamping assembly further comprises a base plate, a first clamping member, and a second clamping member, the first clamping member and the second clamping member slidably coupled to the base plate via a tongue and groove.

The lift system as in any of the preceding clauses, further comprising a rack and pinion assembly, the rack and pinion assembly including a rack coupled to the base plate, a gear engaged with the rack and coupled to one of the first clamping member or the second clamping member, and a pinion engaged with the gear and rotatably coupled to the one of the first clamping member or the second clamping member.

The lift system as in any of the preceding clauses, wherein one or more pins secures the first clamping member and the second clamping member to one another.

The lift system as in any of the preceding clauses, wherein the rail extends at least partially around the turbomachine and includes a first column, a second column, and a crossbeam extending between the first column and the second column.

A method for installation of a combustion can into a combustion section of a turbomachine, the method comprising: securing the combustion can into a combustion can cradle assembly, the combustion can cradle assembly forming part of a portable cart assembly that includes a telescopic member coupled to the combustion can cradle assembly; coupling the portable cart assembly to a slide assembly, the slide assembly movably coupled to a rail and connected to a drive assembly; operating a drive assembly to move the slide assembly and the portable cart assembly along the rail; extending the telescopic member to align the combustion can cradle assembly and the combustion can with a respective opening in the combustion section of the turbomachine.

The method as in any of the preceding clauses, wherein the telescopic member is a first telescopic member, and wherein the slide assembly further comprises a second telescopic member extending from a main plate of the slide assembly to the combustion can cradle assembly, the method further comprising: extending the second telescopic member to pivot the telescopic member about the pivot point to align the combustion can with a respective opening in the combustion section of the turbomachine.

The method as in any of the preceding clauses, wherein a fine movement assembly couples the telescopic member to the combustion can cradle assembly, and wherein the method further comprises adjusting a position of the combustion can with the fine movement assembly by performing at least one of the following steps: translating the combustion can cradle assembly in a first direction relative to the telescopic member by turning a threaded track rod coupled to a clamping assembly, the threaded track rod disposed in a track, the clamping assembly coupled to the combustion can cradle assembly; rotating the combustion can cradle assembly via a ball and socket joint formed between a ball member and a socket defined by the clamping assembly, the ball member coupled to the combustion can cradle assembly; or translating the combustion can cradle assembly in a second direction perpendicular to the first direction by operating a rack and pinion assembly.

What is claimed is:

1. A lift system for installation and removal of a combustion can from a turbomachine, the lift system comprising:
   a rail extending at least partially around the turbomachine and including a first column, a second column, and a cross-beam extending between the first column and the second column;
   a portable cart assembly comprising a combustion can cradle assembly coupled to a telescopic member, the combustion can cradle assembly configured to removably couple to a combustion can of the turbomachine; and
   a slide assembly removably couplable to the portable cart assembly and the rail, the slide assembly movable with the portable cart assembly along the rail to adjust a position of the combustion can cradle assembly.

2. The lift system as in claim 1, further comprising a drive assembly coupled to the rail, the drive assembly including a motor, a gearbox, one or more sprockets, and a drive chain coupled to the slide assembly and the motor such that operation of the motor moves the slide assembly along the rail.

3. The lift system as in claim 1, wherein the slide assembly comprises a main plate extending between a first end and a second end.

4. The lift system as in claim 3, wherein the slide assembly further comprises one or more slidable couplings extending from the main plate, the one or more slidable couplings surrounding the rail.

5. The lift system as in claim 3, wherein the slide assembly further includes one or more connection members extending from the first end of the main plate, and wherein a pin extends through the one or more connection members and the telescopic member to rotatably couple the portable cart assembly to the slide assembly.

6. The lift system as in claim 3, wherein the telescopic member is a first telescopic member, and wherein the slide assembly further includes a second telescopic member pivotably coupled to the main plate and pivotably coupled to the combustion can cradle assembly.

7. The lift system as in claim 1, wherein the combustion can cradle assembly defines a cylindrical coordinate system having an axial direction, a radial direction, and a circumferential direction, and wherein the combustion can cradle assembly is configured to move along any of the axial direction, the radial direction, or the circumferential direction.

8. The lift system as in claim 1, wherein the combustion can cradle assembly comprises an annular ring, an upper assembly, a lower assembly, and one or more threaded rods extending between the upper assembly and the lower assembly.

9. The lift system as in claim 8, wherein the upper assembly includes an upper pressure plate and an upper connection member, wherein the lower assembly includes a lower pressure plate and a lower connection member, and wherein the one or more threaded rods extends between the upper connection member and the lower connection member.

10. The lift system as in claim 8, wherein the lower assembly includes one or more handle bars extending from the lower pressure plate.

11. The lift system as in claim 8, further comprising a fine movement assembly coupling the telescopic member to the combustion can cradle assembly.

12. The lift system as in claim 11, wherein the fine movement assembly comprises a track, a clamping assembly defining a socket and coupled to the track via a threaded track rod, a ball member coupled to the lower assembly and extending into the socket to form a joint with the clamping assembly.

13. The lift system as in claim 12, wherein the clamping assembly further comprises a base plate, a first clamping member, and a second clamping member, the first clamping member and the second clamping member slidably coupled to the base plate via a tongue and groove.

14. The lift system as in claim 13, further comprising a rack and pinion assembly, the rack and pinion assembly including a rack coupled to the base plate, a gear engaged with the rack and coupled to one of the first clamping member or the second clamping member, and a pinion engaged with the gear and rotatably coupled to the one of the first clamping member or the second clamping member.

15. The lift system as in claim 13, wherein one or more pins secures the first clamping member and the second clamping member to one another.

16. A method for installation of a combustion can into a combustion section of a turbomachine, the method comprising:
   securing the combustion can into a combustion can cradle assembly, the combustion can cradle assembly forming part of a portable cart assembly that includes a telescopic member coupled to the combustion can cradle assembly;
   coupling the portable cart assembly to a slide assembly, the slide assembly movably coupled to a rail and connected to a drive assembly, wherein the rail extends at least partially around the turbomachine and includes a first column, a second column, and a cross-beam extending between the first column and the second column;
   operating a drive assembly to move the slide assembly and the portable cart assembly along the rail; and
   extending the telescopic member to align the combustion can cradle assembly and the combustion can with a respective opening in the combustion section of the turbomachine.

17. The method as in claim 16, wherein the telescopic member is a first telescopic member, and wherein the slide assembly further comprises a second telescopic member extending from a main plate of the slide assembly to the combustion can cradle assembly, the method further comprising:
   extending the second telescopic member to pivot the telescopic member about the pivot point to align the combustion can with a respective opening in the combustion section of the turbomachine.

18. The method as in claim 16, wherein a fine movement assembly couples the telescopic member to the combustion can cradle assembly, and wherein the method further comprises adjusting a position of the combustion can with the fine movement assembly by performing at least one of the following steps:
   translating the combustion can cradle assembly in a first direction relative to the telescopic member by turning a threaded track rod coupled to a clamping assembly, the threaded track rod disposed in a track, the clamping assembly coupled to the combustion can cradle assembly;

rotating the combustion can cradle assembly via a ball and socket joint formed between a ball member and a socket defined by the clamping assembly, the ball member coupled to the combustion can cradle assembly; or translating the combustion can cradle assembly in a second direction perpendicular to the first direction by operating a rack and pinion assembly.

19. A lift system for installation and removal of a combustion can from a turbomachine, the lift system comprising:

a rail;

a portable cart assembly comprising a combustion can cradle assembly coupled to a telescopic member, the combustion can cradle assembly configured to removably couple to a combustion can of the turbomachine, wherein the combustion can cradle assembly comprises an annular ring, an upper assembly, a lower assembly, and one or more threaded rods extending between the upper assembly and the lower assembly; and a slide assembly removably couplable to the portable cart assembly and the rail, the slide assembly movable with the portable cart assembly along the rail to adjust a position of the combustion can cradle assembly.

* * * * *